US012757234B2

(12) United States Patent
Haghighat et al.

(10) Patent No.: US 12,757,234 B2
(45) Date of Patent: Oct. 6, 2026

(54) METHODS AND APPARATUSES FOR MULTI-TRP TRANSMISSION IN HST SCENARIOS

(71) Applicant: INTERDIGITAL PATENT HOLDINGS, INC., Wilmington, DE (US)

(72) Inventors: Afshin Haghighat, Ile-Bizard (CA); Moon-il Lee, Melville, NY (US); Loic Canonne-Velasquez, Dorval (CA); Paul Marinier, Brossard (CA); Nazli Khan Beigi, Longueuil (CA); Young Woo Kwak, Woodbury, NY (US); Virgil Comsa, Montreal (CA); Prasanna Herath, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 546 days.

(21) Appl. No.: 17/798,916

(22) PCT Filed: Feb. 12, 2021

(86) PCT No.: PCT/US2021/017884
§ 371 (c)(1),
(2) Date: Aug. 11, 2022

(87) PCT Pub. No.: WO2021/163508
PCT Pub. Date: Aug. 19, 2021

(65) Prior Publication Data

US 2023/0064231 A1 Mar. 2, 2023

Related U.S. Application Data

(60) Provisional application No. 62/976,158, filed on Feb. 13, 2020, provisional application No. 63/061,293,
(Continued)

(51) Int. Cl.
*H04W 72/04* (2023.01)
*H04L 5/00* (2006.01)
(Continued)

(52) U.S. Cl.
CPC ........... *H04W 72/51* (2023.01); *H04L 5/0053* (2013.01); *H04L 5/0048* (2013.01); *H04W 56/001* (2013.01)

(58) Field of Classification Search
CPC ..... H04W 72/51; H04W 72/23; H04W 36/00; H04W 84/005; H04L 5/0053
See application file for complete search history.

(56) References Cited

U.S. PATENT DOCUMENTS 10,728,900 B2 7/2020 Futaki
11,071,101 B2 7/2021 Seo et al.
(Continued)

FOREIGN PATENT DOCUMENTS

CA 3102788 A1 12/2019
CN 110149288 A 8/2019
(Continued)

OTHER PUBLICATIONS

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
(Continued)

*Primary Examiner* — Faruk Hamza
*Assistant Examiner* — Aixa A Guadalupe Cruz
(74) *Attorney, Agent, or Firm* — Volpe Koenig

(57) ABSTRACT

A method and apparatus may comprise receiving zone configuration information pertaining to one or more zones
(Continued)

having one or more zone-ids. For each zone-id of the zone-ids, the configuration information may indicate one or more of a BRS, a set of TCI states for receiving a PDSCH transmission, a search space, a CORESET configuration or uplink resources. The method may further comprise determining a zone-id of the one or more zones-ids, based on a measurement of one or more BRSs indicated via the configuration information. An indication of the determined zone-id may be transmitted to a base station using uplink resources associated with the zone-id.

20 Claims, 17 Drawing Sheets

Related U.S. Application Data filed on Aug. 5, 2020, provisional application No. 63/094,745, filed on Oct. 21, 2020.

(51) Int. Cl.

| | |
|---|---|
| ***H04W 72/51*** | (2023.01) |
| ***H04W 76/27*** | (2018.01) |
| *H04W 56/00* | (2009.01) |

(56) References Cited

U.S. PATENT DOCUMENTS

| | | | | |
|---|---|---|---|---|
| 2018/0091968 | A1 | 3/2018 | Ly et al. | |
| 2019/0116012 | A1 | 4/2019 | Nam et al. | |
| 2019/0260447 | A1 | 8/2019 | Nam et al. | |
| 2019/0379506 | A1* | 12/2019 | Cheng | H04W 88/06 |
| 2020/0022041 | A1 | 1/2020 | Ly et al. | |
| 2021/0243734 | A1* | 8/2021 | Zhang | H04L 5/0032 |
| 2023/0020735 | A1* | 1/2023 | Matsumura | H04W 16/28 |

FOREIGN PATENT DOCUMENTS

| | | | |
|---|---|---|---|
| WO | 2019020091 | A1 | 1/2019 |
| WO | 2019099659 | A1 | 5/2019 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

Interdigital, Inc., "Enhanced M-TRP for HST-SFN," 3GPP TSG RAN WG1 #102-e, R1-2005486, e-Meeting (Aug. 17-28, 2020).

Third Generation Partnership Project, "Technical Specification Group Radio Access Network; NR; Multiplexing and channel coding (Release 16)," 3GPP TS 38.212 V16.0.0 (Dec. 2019).

Third Generation Partnership Project, "Technical Specification Group Radio Access Network; NR; Multiplexing and channel coding (Release 16)," 3GPP TS 38.212 V16.4.0 (Dec. 2020).

Third Generation Partnership Project, "Technical Specification Group Radio Access Network; NR; Physical layer procedures for control (Release 15)," 3GPP TS 38.213 V16.0.0 (Dec. 2019).

Third Generation Partnership Project, "Technical Specification Group Radio Access Network; NR; Physical layer procedures for control (Release 16)," 3GPP TS 38.213 V16.4.0 (Dec. 2020).

Third Generation Partnership Project, "Technical Specification Group Radio Access Network; NR; Physical layer procedures for data (Release 16)," 3GPP TS 38.214 V16.4.0 (Dec. 2020).

Third Generation Partnership Project, "Technical Specification Group Radio Access Network; NR; Physical layer procedures for data (Release 16)," 3GPP TS 38.214 V16.0.0 (Dec. 2019).

Third Generation Partnership Project, "Technical Specification Group Radio Access Network; NR; Medium Access Control (MAC) protocol specification (Release 16)," 3GPP TS 38.321 V16.3.0 (Dec. 2020).

Third Generation Partnership Project, "Technical Specification Group Radio Access Network; NR; Medium Access Control (MAC) protocol specification (Release 15)," 3GPP TS 38.321 V15.11.0 (Dec. 2020).

Third Generation Partnership Project, "Technical Specification Group Radio Access Network; NR; Medium Access Control (MAC) protocol specification (Release 15)," 3GPP TS 38.321 V15.8.0 (Dec. 2019).

Third Generation Partnership Project, "Technical Specification Group Radio Access Network NR Radio Resource Control (RRC) protocol specification (Release 15)," 3GPP TS 38.331 V15.8.0 (Dec. 2019).

Third Generation Partnership Project, "Technical Specification Group Radio Access Network; NR; Radio Resource Control (RRC) protocol specification (Release 15)," 3GPP TS 38.331 V15.12.0 (Dec. 2020).

Third Generation Partnership Project, "Technical Specification Group Radio Access Network; NR; Radio Resource Control (RRC) protocol specification (Release 16)," 3GPP TS 38.331 V16.3.1 (Jan. 2021).

* cited by examiner

METHODS AND APPARATUSES FOR MULTI-TRP TRANSMISSION IN HST SCENARIOS

CROSS-REFERENCE TO RELATED APPLICATIONS

This application is the U.S. National Stage, under 35 U.S.C. § 371, of International Application No. PCT/US2021/017884 filed Feb. 12, 2021, which claims the benefit of U.S. Provisional Application No. 62/976,158, filed Feb. 13, 2020, U.S. Provisional Application No. 63/061,293, filed Aug. 5, 2020 and U.S. Provisional Application No. 63/094,745, filed Oct. 21, 2020, the contents of each of which are incorporated herein by reference.

BACKGROUND

In New Radio (NR), Multi-Transmit/Receive Point (M-TRP) operation is supported with an initial focus on downlink transmissions. As such, an NR WTRU may receive and process multiple NR Physical Downlink Control Channels (PDCCHs) and NR Physical Downlink Shared Channels (PDSCHs).

In NR Release 16, M-TRP transmission was developed to support M-TRP transmission for downlink shared data channel for Enhanced Mobile Broadband (eMBB) and Ultra Reliable Low Latency Communication (URLLC) scenarios. To enhance reliability and robustness of downlink data transmission for URLLC, four different transmission schemes for PDSCH were agreed. The supported mechanisms are based on use of additional resources in spatial, frequency and time domains. Depending on the utilized scheme, the additional resources may be used to enable a lower code rate for transmission or to support repetition of the original transmission.

NR Release 17 may support enhancements for both Frequency Range 1 (FR1) and Frequency Range 2 (FR2) operations. As one goal of NR Release 17, the reliability and robustness enhancements developed for PDSCH in Release 16 may be extended for other physical channels such as PDCCH, PUSCH and PUCCH. Such enhancements may leverage use of M-TRP or multi-panel capabilities. Furthermore, Quasi Co-Location (QCL) and Transmission Configuration Indicator (TCI)-related enhancements to enable inter-cell M-TRP with multiple DCI-based multi-PDSCH may be targeted. Also, beam management aspects that were not studied in Release 16 may be developed.

SUMMARY

A method and apparatus may receive zone configuration information pertaining to one or more zones having one or more zone identifiers (zone-ids). For each zone-id of the zone-ids, the configuration information may indicate one or more of a beam reference signal (BRS), a set of transmission configuration indicator (TCI) states for receiving a physical downlink shared channel (PDSCH) transmission, a search space, a control resource set (CORESET) configuration or uplink resources. The method may further comprise determining a zone-id of the one or more zones-ids, based on a measurement of one or more BRSs indicated via the configuration information. An indication of the determined zone-id may be transmitted to a base station using uplink resources associated with the zone-id.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
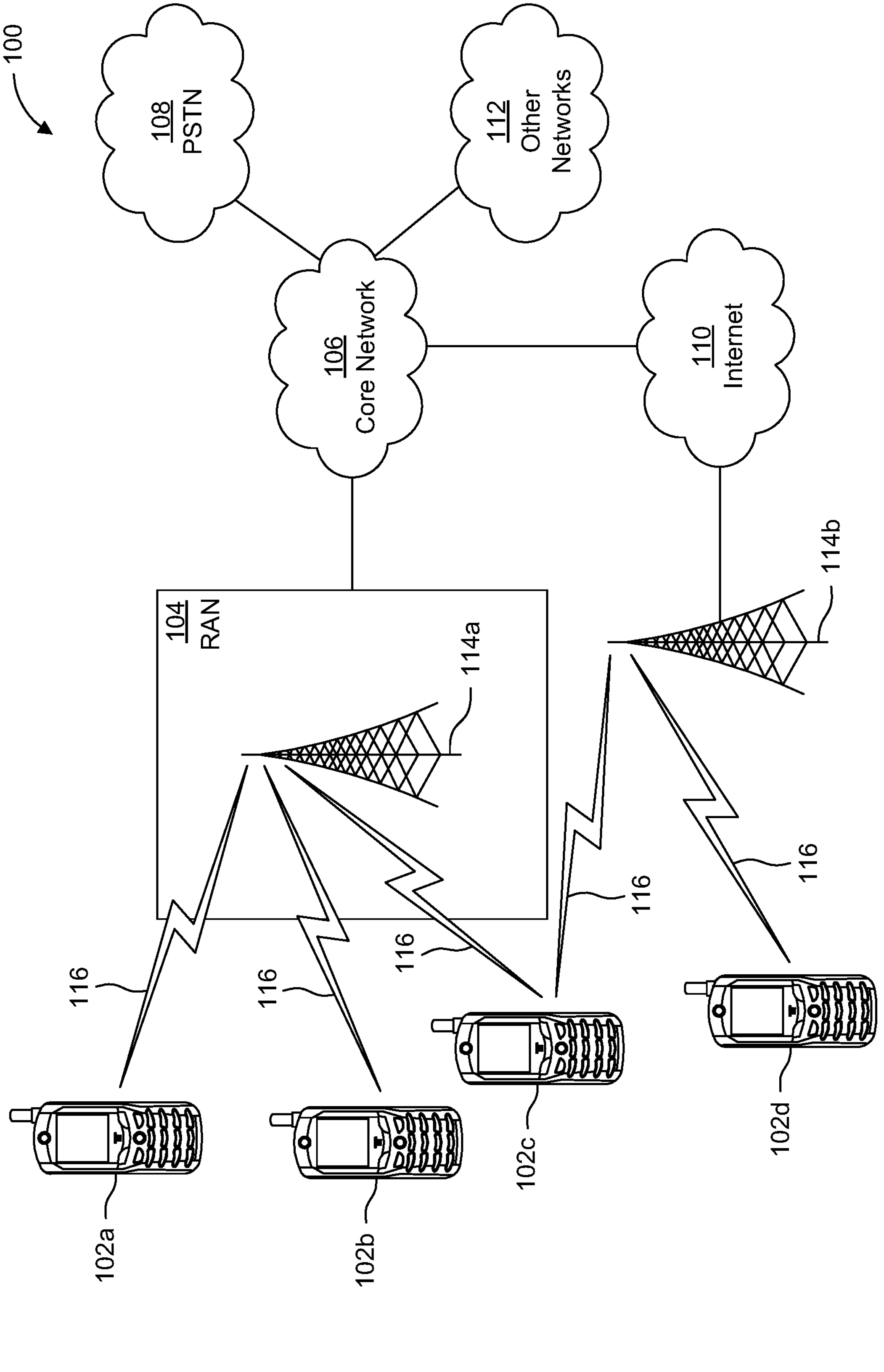
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a WTRU.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102b, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
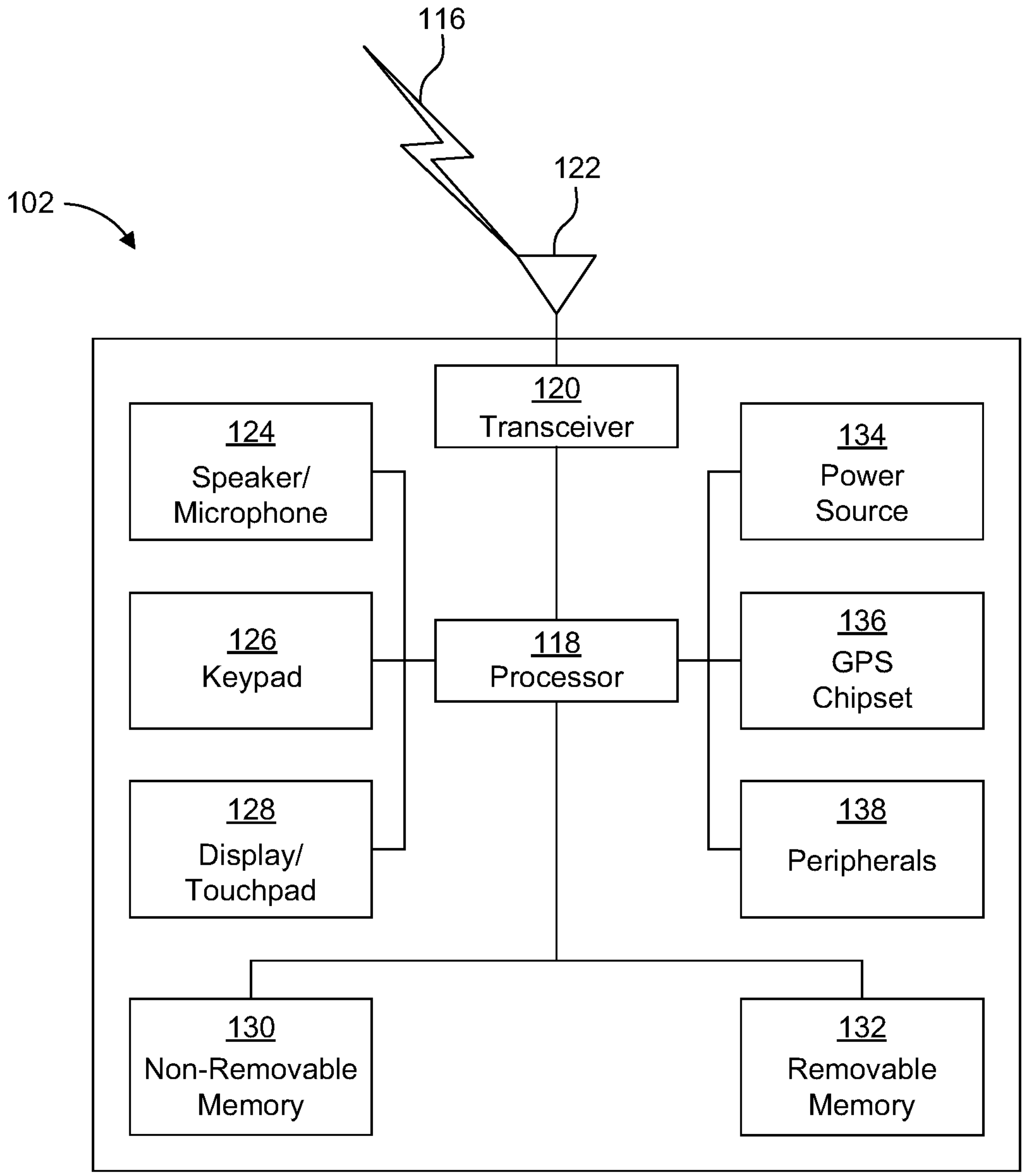
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
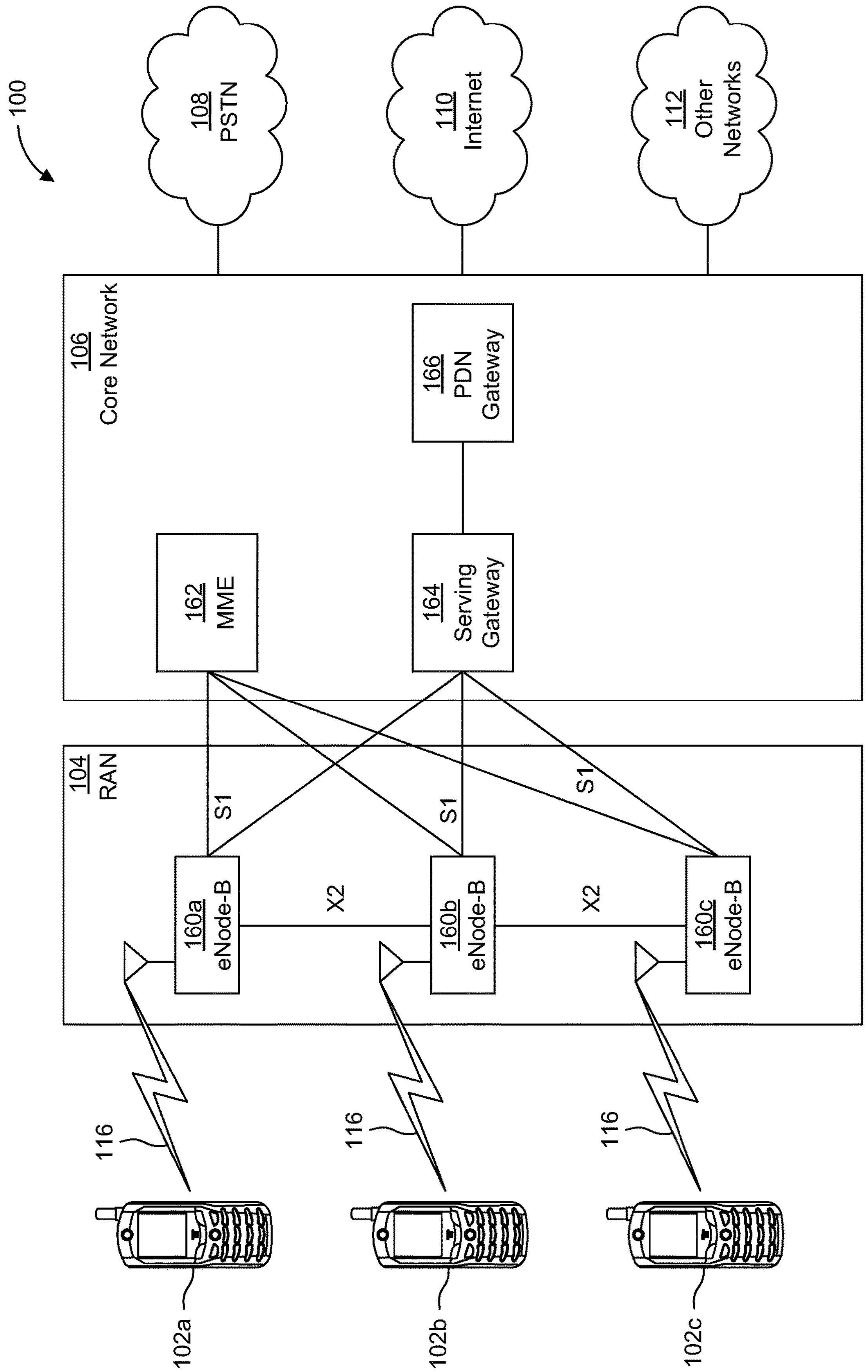
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
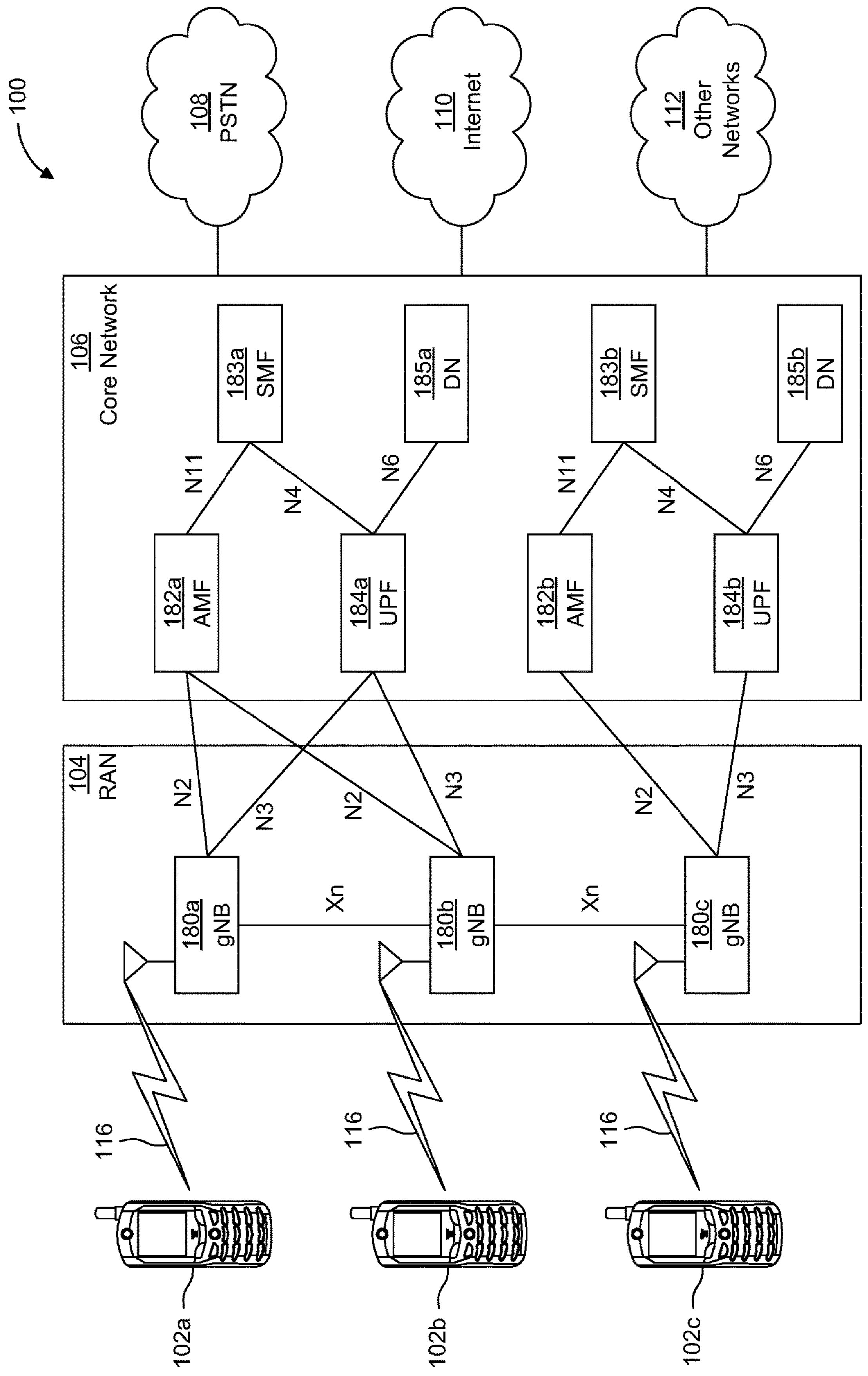
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102b, 102*c* over the air interface 116. In one embodiment, the gNBs 180*a*, 180*b*, 180*c* may implement M IMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating WTRU IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In Release 15 NR, one or more Control Resource Sets (CORESETs) may be configured per bandwidth part (BWP), and each CORESET may be configured with one or more beam reference signals via Radio Resource Control (RRC) signaling. The beam reference signals may be either Non-Zero Power Channel State Information Reference Signals (NZP-CSI-RS), which may include an NZP-CSI-RS resource-ID, or Synchronization Signal Block (SSB) signals, which may include a SSB-index. A beam reference signal may be indicated within the configured beam reference signals via Medium Access Control (MAC) Control Elements (CEs) for monitoring PDCCH search spaces associated with the CORESET, and the beam reference signal indication may be signaled via a Transmission Configuration Indicator (TCI) state.

One or more TCI states may be configured for a CORESET, and each TCI state may include quasi co-location (QCL) information. QCL information may include beam reference signal information. A TCI state may be indicated for a CORESET via a MAC-CE within the configured TCI states to indicate a beam reference signal for monitoring PDCCH search spaces associated with the CORESET.

One or more PDCCH search spaces may be associated with a CORESET, and a WTRU may determine a beam, such as a spatial Rx beam, for monitoring a PDCCH search space based on the determined beam of the associated CORESET for the PDCCH search spaces.

An associated beam reference signal (BRS) may be indicated as a reference signal index with QCL type-D. A BRS may be interchangeably used with the terms beam RS, CSI-RS, SSB, SSB/PBCH block, tracking reference signal (TRS) and sounding reference signal (SRS).

In NR, time and frequency resources that may be used by the WTRU to report CSI may be controlled by a 5G node B or next generation Node B (gNB). CSI may consist or may be comprised of a channel quality indicator (CQI), precoding matrix indicator (PMI), CSI-RS resource indicator (CRI), SS/PBCH block resource indicator (SSBRI), layer indicator (LI), rank indicator (RI) or a Layer 1 reference signal receive power (L1-RSRP).

The framework may operate based on three main configuration objects, which are: CSI-ReportConfig, CSI-ResourceConfig and a list or lists of trigger states. The CSI-ReportConfig may contain N≥1 reporting settings in which details related to the measurement reporting mechanism are captured. The CSI-ResourceConfig may include M≥1 different resource settings that may be coupled with at least one of N Report settings.

There may be two options for trigger state lists, namely, CSI-AperiodicTriggerStateList and CSI-SemiPersistentOnPUSCH-TriggerStateList, each of which may contain at least one trigger state associated to a defined CSI-ReportConfigs setting.

Figure 2:
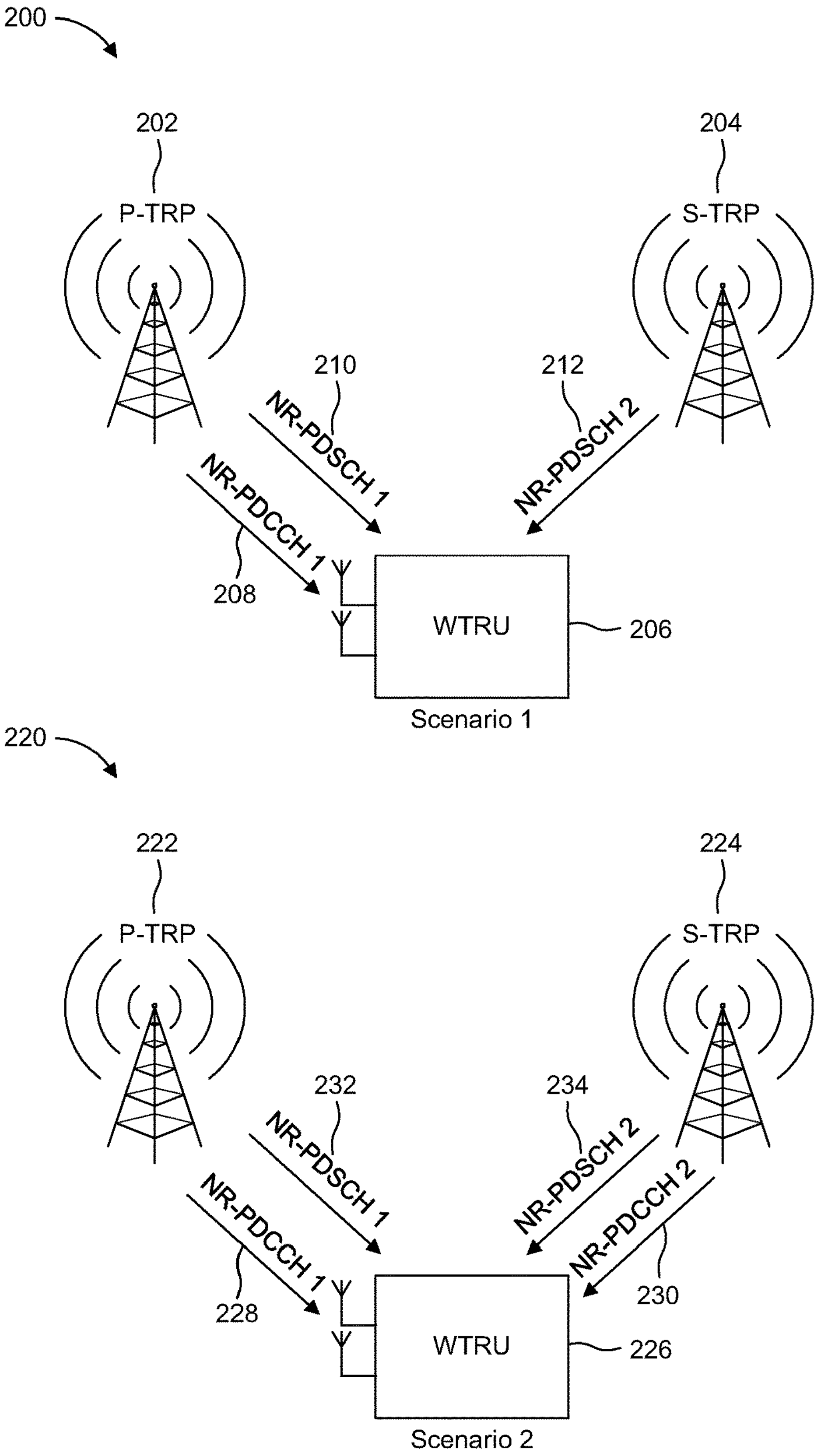
FIG. 2 shows two options of downlink M-TRP operations in which a Primary (P-TRP) and a Secondary TRP (S-TRP) communicate with a WTRU.

FIG. 2 shows two example scenarios 200, 220 for downlink M-TRP operations. In the first scenario 200, a Primary (P-TRP) 202 and a Secondary TRP (S-TRP) 204 communicate with a WTRU 206. A single NR-PDCCH transmission 208 received from the P-TRP 202 schedules a single NR-PDSCH transmission, of which separate layers 210, 212 are transmitted from separate TRPs 202*a*, 202*b*.

In the second scenario, a P-TRP 222 and S-TRP 224 are used to schedule transmissions to a WTRU 226. In this scenario, multiple NR-PDCCH transmissions 228, 230 may each schedule a respective NR-PDSCH transmission 232, 234 for which each NR-PDSCH transmission is transmitted from a separate TRP 232, 234. NR specifications may support, for example, two NR-PDSCHs and two NR-PDCCHs. An aspect of NR R-17 MIMO may be to apply the M-TRP concept to support, for example, a high speed train (HST) scenario in a single frequency network (HST-SFN).

Figure 3:
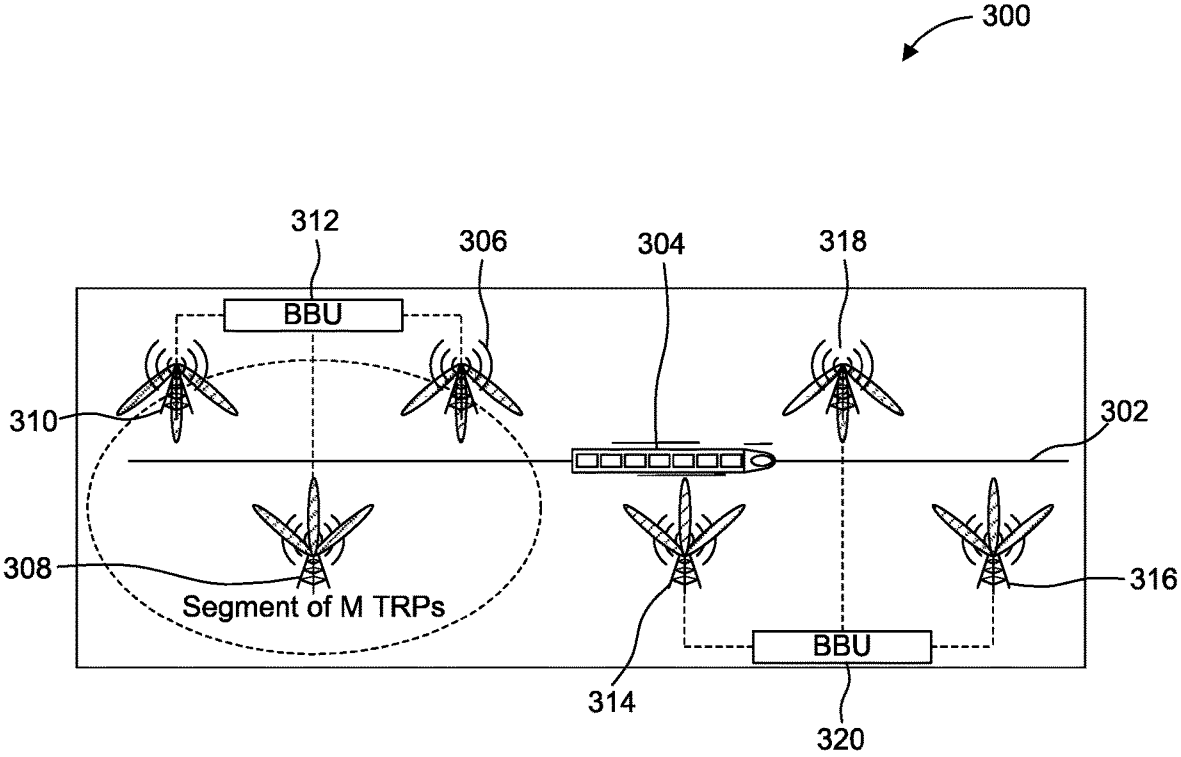
FIG. 3 shows a High Speed Train Single Frequency Network (HST-SFN) scenario in which clusters of M-TRP deployments may be spread out along a track path.

FIG. 3 shows an HST-SFN scenario 300 in which M-TRP deployments may be spread out along a track path 302 to provide service to a train 304. A first cluster of TRPs may include TRPs 306-310 connected to baseband unit (BBU) 312. A second cluster of TRPs may include TWPs 314-318 connected to BBU 320. A BBU may refer to a unit that processes baseband in telecommunication systems. A typical wireless telecom station is comprised of a BBU and one or more remote radio units. These remote radio units are shown as TRPs in FIG. 3. A baseband unit may be connected with the TRPs via optical fiber and may be responsible for communication through the physical interface.

Embodiments directed to TCI state determination based on zone are described herein. One or more zones may be defined, configured, or used in an HST-SFN network. A zone may be configured or determined based on geographical coordinates (e.g., longitude and latitude) of a WTRU, wherein the zone may be associated with a zone identity (e.g., zone-id). In such embodiments, one or more procedures may be performed.

In some embodiments, for example, a WTRU may determine an associated zone (or zone-id) based on its geographical coordinates (e.g., WTRU's geographical coordinates are within the corresponding range).

In some embodiments, a WTRU may determine an associated zone (or zone-id) based on associated cell identity (or a TRP identity). A zone may be configured based on the zone size (e.g., x meters in longitude and y meters in latitude). A zone size may be configured or indicated in higher layer signaling (e.g., master information block (MIB), SIB, RRC, or MAC-CE). A zone size may be determined based on one or more WTRU-specific parameter (e.g., WTRU speed, moving direction, WTRU-identity) and/or system parameters (e.g., cell identity, numerology).

In some embodiments, a zone may be configured based on radio coverage of a cell. For example, a WTRU may determine a zone based on downlink measurement of one or more beam reference signal from one or more TRPs or cells. Hereafter, a zone may be interchangeably used with area, location, and positioning.

In some embodiments, a WTRU may receive a configuration of an association between TCI state (or TCI state group) and zone. For example, one or more TCI states may be associated with a zone (or zone-id) and the association information may be configured via a higher layer signaling. In such scenarios, one or more of the following procedures may be performed. For example, a WTRU may determine a TCI state for downlink reception and/or uplink transmission based on the determined zone-id. For example, a WTRU may first determine zone-id based on the WTRU's geographical coordinates and the WTRU may determine TCI state for downlink reception (e.g., PDCCH and/or PDSCH) and/or uplink transmission (e.g., PUCCH, PUSCH, SRS, PRACH) based on the determined zone-id. A corresponding beam reference signal (e.g., SSB index, CSI-RS index, SRS resource index) for a TCI state may be determined based on a zone-id. For example, a WTRU may receive a TCI state in a DCI for downlink or uplink transmission, wherein the WTRU may interpret the TCI state differently based on the zone-id determined. A first beam reference signal may be used for a TCI state when a first zone-id is determined and a second beam reference signal may be used for the TCI state when second zone-id is used. One or more N-bit TCI state fields may be used in a DCI scheduling downlink or uplink transmission, wherein the N-bit TCI state fields may be associated with a set of TCI states, wherein the set of TCI states may be determined based on zone-id determined. For example, a first set of TCI states may be used for the N-bit TCI state field when a first zone-id is determined, and a second set of TCI states may be used for the N-bit TCI state field when a second zone-id is determined.

In some embodiments, a WTRU may indicate or report its determined zone-id to a nodeB (e.g., a gNB). For example, a WTRU may send or report the determined zone-id when the zone-id is changed. For example, a WTRU may report an updated zone-id when the WTRU detected associated zone-id change. In some cases, the zone-id update report may be indicated in PUSCH, PUCCH, MAC-CE, or RRC. In some cases, each zone-id may be associated with an uplink channel (e.g., PRACH, PRACH sequence, PUCCH resource, PUSCH resource, SRS resource) and the WTRU send the associated uplink channel based on the determined zone-id.

In some embodiments, a CORESET may be configured with one or more TCI states, and one of the TCI states may be determined or used at a time for monitoring associated PDCCH search spaces. A WTRU may determine the one of the TCI states for a CORESET based on the determined zone-ID. In some embodiments, a TCI state associated with a zone-id may be configured via a higher layer signaling In some embodiments, a WTRU may monitor a subset of PDCCH search spaces that may be associated with one or more CORESETs corresponding to the zone-id determined. For example, a WTRU may be configured with one or more CORESETs and each CORESET may be associated with one or more zone-ids, therefore a subset of CORESETs may be determined based on the determined zone-id.

Hereafter, the term TCI state may be interchangeably used with spatial relation, QCL association, QCL type-D, and/or beam.

Figure 4A:
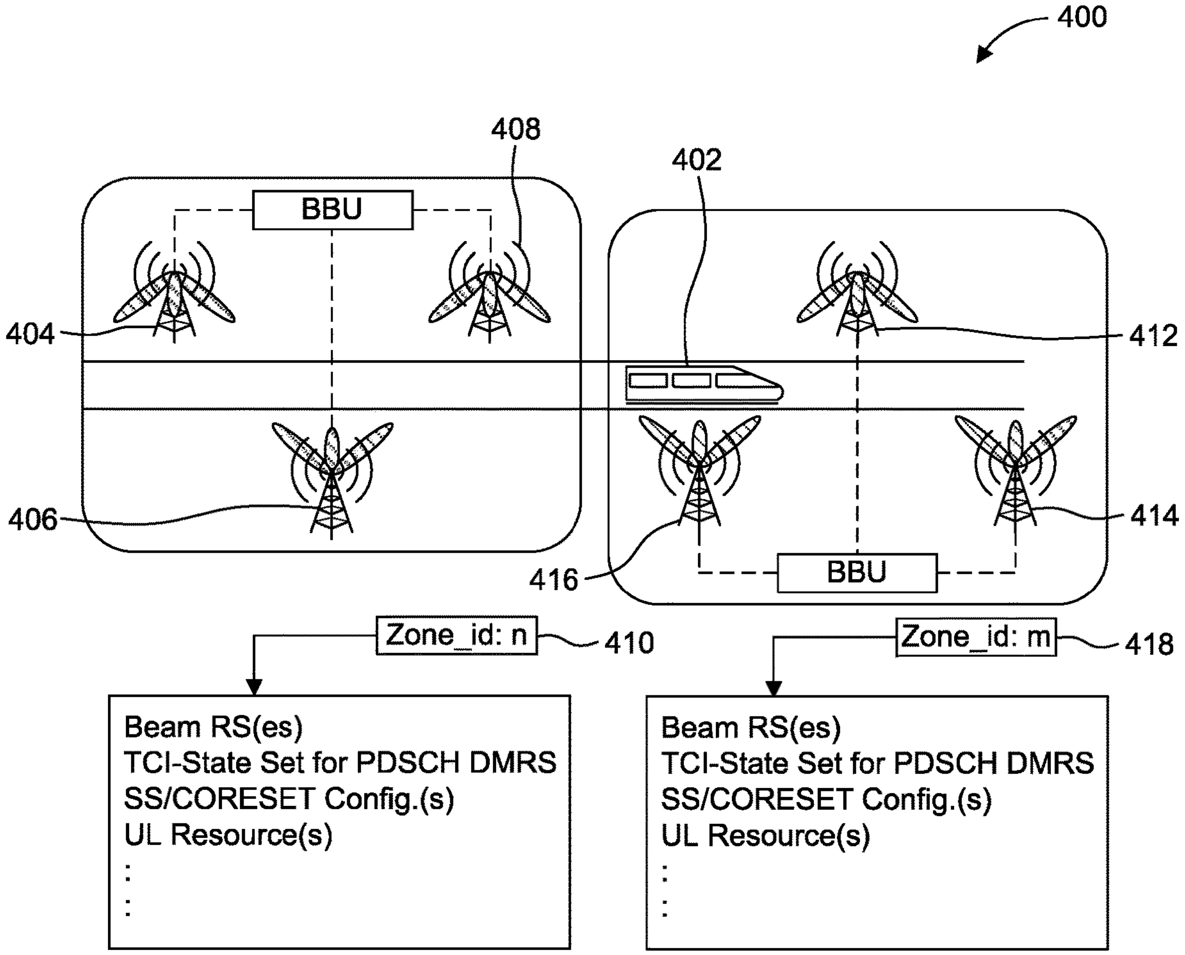
FIG. 4A shows an exemplary M-TRP configuration for a High Speed Train (HST) scenario.

FIG. 4A shows a HST-SFN scenario 400 in which clusters of M-TRP deployments, comprising TRPs 404-408 and TRPs 412-416, may be spread out along a track path of a train 402. To increase robustness and also reduce signaling associated with handover, a HST-SFN scenario 400 may employ an architecture based on clusters of M-TRP deployments. Therefore, to support HST-SFN deployment scenario, embodiments and enhancements related to QCL assumptions, TCI framework, control channel design and CSI framework may be advantageous.

In this example of an M-TRP configuration for HST scenarios, a WTRU may determine the zone it is in and determine the associated zone-based spatial parameters associated with a received TCI state. This may be performed to receive data in the zone. A zone identification and zone-based parameters may be used to reduce signaling overhead in an HST scenario.

For example, if a WTRU is located on a train 402 and is serviced by one or more of TRPs 404-408, the WTRU may determine a zone-id of n 410. If the WTRU is serviced by one or more of TRPs 412-416, the WTRU may determine a zone-id of m 418. The WTRU may be configured for zone-id n 410 one or more first beam RSs, a TCI state set, an SS/CORESET configuration and uplink resources. For zone-id m, the WTRU may be configured with a second set of configuration parameters including one or more second beam RSs, a TCI state set, a second SS/CORESET and second UL resources. A zone-id may be determined from among the configured zone-ids based on measurements of one or more BRS from among the at least one BRS configured for each zone-id and geographical coordinates of the WTRU.

Figure 4B:
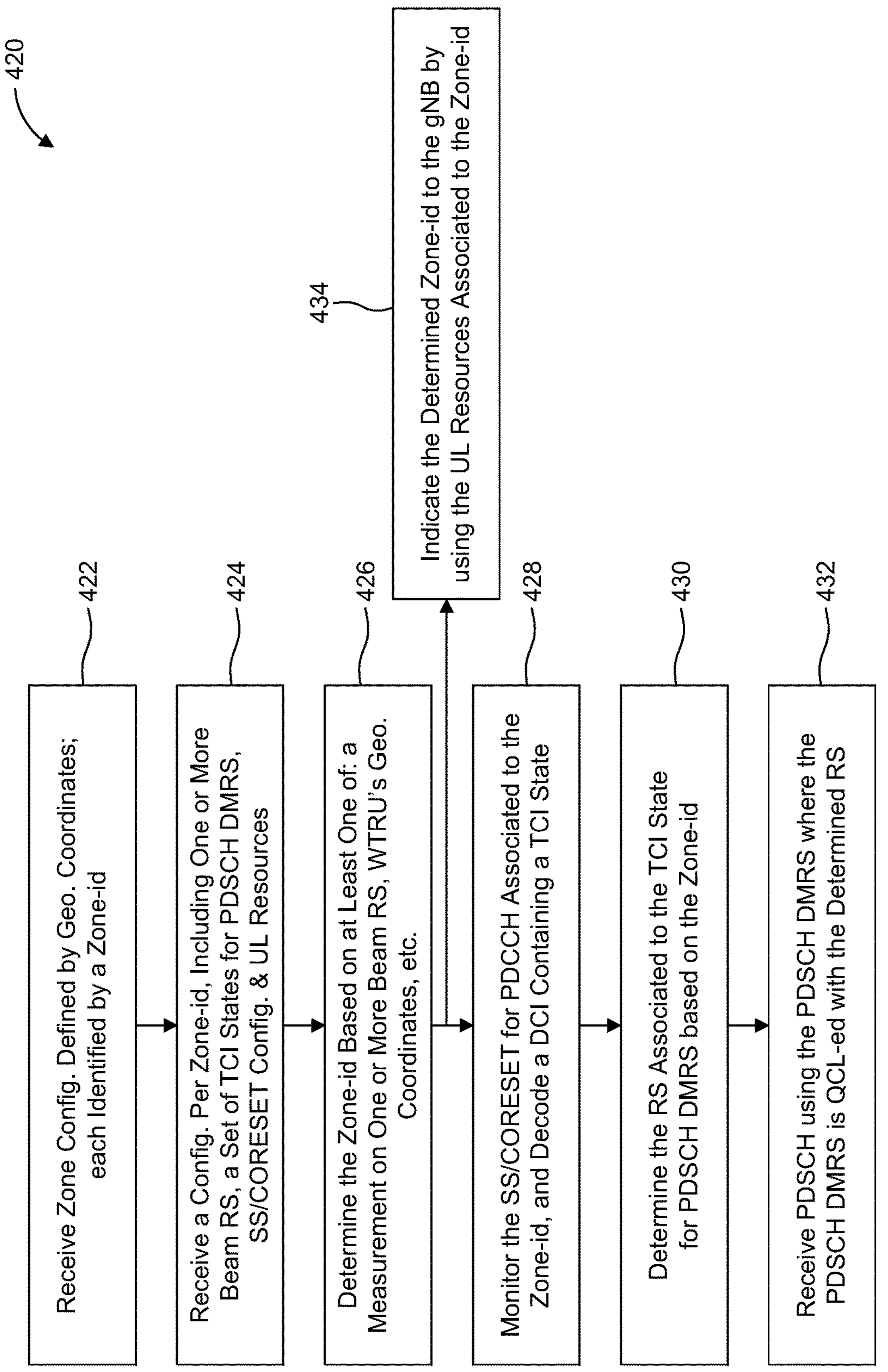
FIG. 4B shows a procedure for Transmission Configuration Indicator (TCI) state determination using zone configurations.

FIG. 4B is a flowchart 420 showing a procedure for a TCI state determination using zone configurations. The procedure may be summarized as follows. The WTRU may receive 422 one or more zone configurations (e.g., defined by geographical coordinates), each identified by an ID, e.g., zone-id. The WTRU may receive 424 for each zone-id at least one beam reference signal (BRS), a set of TCI states for PDSCH reception, a search space/CORESET configuration, and/or uplink resources. The WTRU may determine 426 a zone-id from among the configured zone-ids based on measurements of one or more BRS from among the at least one BRS configured for each zone-id and geographical coordinates of the WTRU.

The WTRU may monitor 428 a search space or CORESET according to the search space or CORESET configuration of the determined zone-id for PDCCH and receive and/or decode a DCI in the PDCCH. The PDCCH may contain an indication of a TCI state for PDSCH reception. The WTRU may determine 430 a reference signal (RS) associated with the received TCI state based on the zone-id. The WTRU may receive 432 a transmission using a PDSCH, for example, by using an associated PDSCH DMRS that is QCL-ed with the determined RS, and indicate 434 the determined zone-id to the gNB using the uplink resources configured for the zone-id.

In an embodiment, one enhancement may involve efficient updating of TCI/QCL information. In NR, quasi-colocation (QCL) relations may refer to the spatial quasi-colocation of reference signals. The QCL relations may be expressed with respect to a delay spread, average delay, Doppler spread, Doppler shift, or spatial Rx parameters. TCI may carry information regarding reference signal antenna ports with which certain PDCCH or PDSCH (DMRS) antenna ports are quasi-located ("QCL-ed").

In some embodiments, a WTRU may be configured with up to 64 TCI states. The subset of TCI states assigned to a WTRU may be signaled to the WTRU through RRC signaling in the corresponding CORESET. The specific TCI state may be signaled more dynamically to WTRU through MAC signaling. A TCI state may comprise of at least one combination of a serving cell, bandwidth part identity, and at least one reference signal. The at least one reference signal may be a CSI-RS or SSB. The WTRU may assume a quasi co-location relationship exists between the ports of such reference signal and the DM-RS ports to assist in the reception of PDCCH or PDSCH transmissions. This may be, for example, for setting or selecting a spatial filter and estimating timing and Doppler spread and/or shift. Configuration of multiple reference signals for a TCI state may allow a WTRU to select the most appropriate spatial filter in a scenario where a channel (e.g. PDCCH or PDSCH) is received from multiple TRPs or beams in an SFN manner. Such a TCI state may be referred to as a "multi-beam" TCI state.

Alternatively, a WTRU may be provided a group of TCI states instead of a single TCI state for the purpose of PDCCH or PDSCH reception, where the WTRU may assume that the same information is transmitted over all DM-RS ports that are quasi-co-located with ports of reference signals of each TCI state of the group. Without loss of generality, a multi-beam TCI state or a group of TCI states may be referred to as "TCI information vector" as described herein.

As shown and described substantially above with respect to FIG. 2, in an HST-SFN network, a WTRU may be served by two or more TRPs at any time. Due to the high mobility of an HST train, the TCI information may require continuous update as the train travels through clusters of TRPs.

A pathway may be partitioned and TCI information vector may be defined. In some embodiments, a WTRU may assume that an entire track path is partitioned to several zones where each zone hosts at least one SFN M-TRP deployment, and each M-TRP deployment has two or more TRPs connected to a single Baseband Unit (BBU).

In some embodiments, a WTRU may determine information about downlink reference signals, for example, beams and DMRS ports, from the configured TCI vector configured for that zone. In some embodiments, a WTRU may be configured with different types of TCI configurations per zone.

In some embodiments, a WTRU may determine the TCI information of each TRP of a zone from a TCI information vector defined per TRP and per bandwidth part. The length of a TCI information vector may be equal to the number of TRPs per zone. Each entry of the information vector may have multiple values corresponding to different configurations or operational modes of a TRP. In an exemplary embodiment, there may be multiple values, and the WTRU may determine the TCI information of different beams of a TRP from different configured values of the entry. For example, a WTRU may determine the TCI information for opposing directions of a TRP, such as outgoing versus inbound beams relative to an HST train from different configured values of an entry indexed to that TRP. In some cases, instead of having multiple values per entry, a WTRU may assume that there may be different classes or types of a TCI information vector.

In an embodiment, a WTRU may be configured with more than one TCI information vector, and each vector may have a different length than other vectors. A WTRU may identify each TCI information vector with an index.

Embodiments directed to indication of TCI information vectors are disclosed herein. In some embodiments, a WTRU may determine the TCI information vector of a zone in a dynamic or semi-static manner.

In the dynamic mode, a WTRU may receive an information element to determine the TCI information vector of a zone with an DCI or MAC CE. A WTRU may decode the received information element to determine the index of the TCI information vector. The indication may determine the TCI information vector of an approaching zone. The approaching zone may start immediately after, or n TRPs after the current TRP, where n may be a configured value. In another embodiment, besides a set of TCI information vectors, the WTRU may be configured with a sequence of indices representing the index of the TCI vectors per zone. A WTRU may receive a single bit DCI or MAC-CE to indicate an increment in the configured sequence to point to the next zone. The approaching zone may start immediately after, or n TRPs after the current TRP, where n may be a configured value.

In the semi-static mode, besides a set of TCI information vectors, a WTRU may be configured with other information to assist the determination of TCI information vector per zone. In some embodiments, a WTRU may be configured with a geo-location table that relates some or every zone to an index where the index represents a TCI information vector. A WTRU may determine the TCI information of a zone by comparing its geo-location to the indices configured in the table. Alternatively, a WTRU may be configured with a sequence of indices where each index represents a TCI information vector. A WTRU may determine the TCI information vector of a zone by referencing and following the configured sequence of indices. In another embodiment, a WTRU may periodically use one or more of the configured TCI information vectors across all zones.

Embodiments directed to conditional reconfiguration of sets of TCI information vectors or sets of TCI states are disclosed herein. In some embodiments, to facilitate large-scale reconfigurations at high-speed, a WTRU may apply a conditional reconfiguration of a set of TCI states or of a set of TCI information vectors based on the results of at least one measurement. For example, a WTRU may be configured with a current set of TCI states or TCI information vectors, and at least one target set of TCI states or TCI information vectors. Only the current set of TCI states or TCI information vectors may be applicable for PDCCH and PDSCH reception at any given time. The WTRU may be configured with at least one measurement configuration for each target set of TCI states or information vectors. Upon triggering a measurement report based on such configuration, the WTRU may reconfigure the current set of TCI states or TCI information vectors as the corresponding target set. The WTRU may apply a default or initial TCI state or TCI information vector among those of the reconfigured set for PDCCH and PDSCH decoding immediately after reconfiguration. The WTRU may also be signaled a target SRS configuration for each target set of TCI states or information vectors and reconfigure the SRS according to the corresponding target set.

In some embodiments, the WTRU may report a subset of at least one TCI information vector among a set of TCI information vectors such that the performance would be maximized. The WTRU may report this information at the physical layer, such as via a new type of CSI, or by MAC CE. The WTRU may trigger the report when there is a change of best TCI information vectors.

As of NR Release 16, at least four different QCL types may be defined, namely; Types A, B, C and D. The QCL information may define what properties of the channel observed by one set of antenna ports may hold accurate for another set of antenna ports. For example, a QCL-Type C may indicate that only average delay and Doppler shift values observed by one set of antenna ports may be assumed for its QCL-ed counterpart, and vice versa. However, if two sets of antenna ports are Type A QCL-ed, besides the average delay and the Doppler shift, it may be assumed that both channels experience a similar Doppler spread and delay spread values.

In a multi-TRP transmission scenario, if a WTRU traveling at high speeds receives transmissions from multiple TRPs from opposite directions of the travel path(s) of the WTRU, the experienced Doppler shift for each transmission may be different. For example, if a high-speed WTRU is between the two TRPs, it may experience a positive Doppler from one TRP and a negative Doppler from another TRP. In some cases, a high-speed WTRU travelling on a direction from one TRP to another may receive an indication that transmission ports from the involved TRPs may impose opposite Doppler shifts.

In some embodiments, a high-speed WTRU may receive such indication for transmission ports of different panels of a same TRP. For instance, once a WTRU passes by a TRP, it may know how to efficiently adapt from a positive Doppler shift to a negative Doppler shift.

A WTRU may receive new QCL configuration information including information about transmission ports that result in an opposite Doppler shift for a high-speed WTRU. For example, one or more QCL configurations for a high-speed WTRU in a multi-TRP system may be considered. Such configurations may include QCL-Type A_n, which may specify an opposite Doppler shift, Doppler spread, average delay, and delay spread; QCL-Type B_n, which may specify an opposite Doppler shift, and Doppler spread; QCL-Type C_n, which may specify an opposite Doppler shift and average delay; QCL-Type E_n which may specify an opposite Doppler shift and delay spread; and QCL-Type F_n, which may specify an opposite Doppler shift, etc.

In some embodiments, a WTRU may not receive a new set of QCL information as indicated above. Instead, a WTRU may receive a new implicit or explicit information element (IE) to assist a WTRU to determine Doppler relation between two sets of transmission ports and interpret their QCL information. In some embodiments, besides receiving an existing Rel-16 QCL information, a WTRU may receive an IE, e.g., a single bit configuration to indicate an opposite Doppler shift value imposed by the indicated QCL-ed transmission ports. In some embodiments, the indicated IE may be part of the RRC configuration, and it may be done per zone or cluster of TRPs. In some embodiments, the IE may be indicated dynamically by a MAC CE or an DCI.

Control channels may be improved for supporting HST. In a high speed train (HST) scenario, a group of WTRUs may have a very high mobility. Therefore, the existing RRC-plus-MAC-CE based beam determination for a CORESET may not provide sufficient robustness for control channel coverage due to the resulting slow beam switching. Considering that a network component, such as a gNB, may know the speed of the group of WTRUs and moving direction, one or more of following mechanisms may be used by the network to improve the control channel reliability for HST scenarios.

For example, one mechanism may predict beam direction of the group of WTRUs, which may improve Tx-Rx beam pairing accuracy since a gNB does not need to wait for beam measurement reporting from a WTRU. Another mechanism may apply common beam control for the group of WTRUs, which may reduce beam switching control signaling overhead and latency. Another mechanism may involve, for example, determining whether a WTRU belongs to a group for a group-based beam management.

A beam used for one or more CORESETs may be determined in an HST scenario. In some embodiments, one or more beam reference signals (BRSs) may be used or configured, and each beam reference signal (BRS) may be configured with a BRS index. A gNB may configure a set of BRS indices that may be associated with a CORESET. For example, a CORESET may have multiple associated BRS indices, and one of the BRS indices may be determined based on a time index. For example, the time index may include at least one of a subframe number, a slot number, an SFN number, a time window number, or a symbol number.

In some cases, a WTRU may determine a BRS for a CORESET, and the determined BRS may be valid within a certain time window. The time window may be a set of consecutive OFDM symbols, slots, subframes, radio frames, or hyper frames. For example, if N time windows are configured, defined or used, each time window may be configured with a BRS for the CORESET. A WTRU may determine a BRS index within configured BRS indices for monitoring one or more search spaces associated with a CORESET based on the time window or time window index.

A set of BRS indices may be configured for a CORESET and the set of BRSs may be indexed in an increasing order. For example, if N BRSs are configured, the set may be expressed as $BRS_1$, $BRS_2$, . . . , $BRS_N$. A first BRS may be determined for a time window based on the measurement of BRSs. For example, a WTRU may determine a first BRS index for a first time slot based on an RSRP measurement of the configured BRSs. A BRS with a highest RSRP may be determined as the first BRS index. If the first BRS index is x, the next BRS index for the next time window may be determined based on the predetermined order. For example, (x+1) modulo N may be used as a BRS index for the CORESET in the next time window. BRS index k for a time window m may be determined as a function of the first BRS index x selected for the first time window and time window index m. A WTRU may report the first BRS index to a gNB and use the reported BRS index and the subsequent BRS indices when the WTRU receives a confirmation from the gNB.

In embodiments described throughout, the term beam reference signal (BRS) may be interchangeably used with TCI state, TCI state-id, QCL-info, NZP-CSI-RS-resource-id, SSB-index.

Beam(s) may be determined for one or more CORESETs using a zone-based beam approach. In some embodiments, one or more BRSs may be used or configured for a CORESET. One or more of the beam reference signals may be determined for the CORESET in a slot for monitoring one or more associated search spaces, and a WTRU may determine the BRS based on a WTRU's geographical location.

In an example, one or more zones may be defined, configured, or used and each zone may be configured with a range of longitude and latitude of a map. A WTRU may determine a corresponding zone based on its current geographical location, for example, via Global Positioning Satellite signaling. The configured zones may be non-overlapped in longitude and latitude in a map, and therefore there may be no ambiguity in determining a zone for a given geographical location. The one or more zones may be configured based on one or more characteristics.

For example, a zone size may be configured with a range of longitudes x and a range of latitudes y, where x and y may be expressed in terms of meters. Therefore, a zone size may be x [m] in longitude and y[m] in latitude. Each zone may have an associated zone-id. For example, the zone-id may be assigned a longitude first and latitude next in increasing order, or vice-versa. A zone size may be configured with parameters x, y and z, wherein the z may be the size of a zone in altitude. Therefore, a zone size may be expressed by x [m] in longitude, y [m] in latitude, and z [m] in altitude. Each zone may have an associated zone-id and may be assigned longitude first, then latitude, and then altitude in increasing order, or in another other, for example latitude→longitude→altitude. A zone may be configured via a higher layer signaling, such as RRC, MAC-CE, or a broadcasting signal such as an MIB or SIB.

In some embodiments, a WTRU may be configured with one or more zones, and each zone may be associated with a beam or a BRS. The determined beam may be at least one of an Rx beam (or spatial Rx parameter) in which to receive a downlink signal such as a PDCCH or PDSCH transmission, a Tx beam (or spatial Tx parameter) in which to transmit an uplink signal such as a PUSCH or PUCCH transmission, and a sidelink signal such as a PSSCH, PSCCH, or PSFCH transmission. One or more scenarios may apply.

For example, a WTRU may receive an association between a zone-id and a beam reference signal. The association information may be configured via one or more of a higher layer signaling such as MAC-CE or RRC, a broadcasting signal such as an MIB or an SIB, or dynamic signaling such as via DCI.

A WTRU may determine the zone-id for monitoring one or more search spaces or for receiving a scheduled PDSCH transmission in a slot associated with a CORESET. A CORESET may be initially configured with a TCI state for beam reference signal determination and once zone-id is determined or used, the configured TCI state may be overridden by a beam reference signal determined by zone-id.

A WTRU may first determine a zone before it receives a downlink signal such as a PDCCH or PDSCH transmission, or reference signals for a slot, and then the WTRU may determine a beam for the downlink signal reception. The WTRU may receive one or more downlink signals using the determined beam.

In some embodiments, a WTRU or a group of WTRUs may report their current associated zone-ids. From the reported zone-id, a gNB may be informed about the geographical location of the group of WTRUs and moving direction. One or more of following scenarios may apply. In one scenario, a WTRU may be triggered to report the zone-id when: the associated zone-id for the WTRU is changed; the WTRU receives a reporting trigger message for instance, via DCI or MAC-CE; a currently assigned or determined beam quality is below a threshold, where the beam quality may be based on at least one of an RSRP, a hypothetical BLER, or an signal to interference plus noise ratio (SINR) of the beam reference signal; or the WTRU is in the boundary of two zones. In another scenario, one or more uplink resources may be reserved for zone-id reporting. A dedicated PUCCH, PUSCH, or PRACH resource may be configured for the zone-id reporting. In an example, a set of PUCCH resources may be configured, and one of the PUCCH resources may be determined as a function of a zone-id, a WTRU-id, or a cell-id. Hereinafter, the term zone may be interchangeably used with zone, cluster, or region.

A zone-based PHY configuration may be employed and/or configured by a WTRU. In some embodiments, a WTRU may be configured with one or more physical layer parameter configurations such as a BWP, a CORESET, a search space, or a PDCCH, PDSCH, PUSCH, or PUCCH configuration. One or more of the physical layer parameter configurations may be used based on the determined zone-id. For example, one or more BWPs may be used, and an active BWP may be determined based on the zone-id associated with the WTRU. A WTRU may start monitoring a PDCCH in the first BWP when a WTRU is associated with a first zone-id, and the WTRU may start monitoring a PDCCH in a second BWP when the WTRU is associated with a second zone-id.

Alternatively, a WTRU may be configured with one or more sets of CORESETs. The WTRU may monitor a PDCCH using the first set of CORESETs when the WTRU is associated with a first zone-id, and the WTRU may monitor a PDCCH using the second set of CORESETs when the WTRU is associated with a second zone-id.

In an embodiment, a WTRU may be configured with more than one search space with a same or different CORESET, and each search space may be assigned to a different zone. In an exemplary embodiment, a WTRU may be configured with two search spaces that may alternate between odd and even zone-ids.

Beam management may be group-based in HST contexts. In some embodiments, one or more beam management operation modes (BMOMs) may be used. A first beam management operation mode (BMOM) may be based on a WTRU-specific beam management mode and a second BMOM may be based on a group-based beam management mode. For example, the first BMOM may determine a beam for a CORESET using RRC and MAC-CE signaling to indicate a beam while the second BMOM may determine a beam for a CORESET based on one or more received or determined indications. For example, such indications may include: an explicit indication in a DCI or a broadcasting signal, wherein the DCI may be a group-common DCI monitored by a group of WTRUs; an implicit determination based on a geographical location information of the WTRU, such as a zone-id, or time window information such as a set of slots, subframes, or radio frames.

A WTRU may determine the BMOM type, for instance, a first or second type, based on at least one of: a higher layer configuration; an absolute WTRU speed; or a configuration of a zone for beam determination. In another embodiment, a WTRU may be configured or indicated to operate in a group-based beam management operation mode, such as a group-based BMOM, wherein the group-based beam management operation mode may be based on determined and/or indicated information. For example, a TCI state index for a CORESET may be indicated via a group DCI which may be monitored in a common search space. An associated RNTI may be a group RNTI. The group RNTI may be determined based on a zone-id selected by a WTRU in a slot. The group RNTI may be configured by a gNB. In another example, a CORESET may be configured for a group of WTRUs. For instance, a CORESET configuration may be provided via a broadcasting signal such as a SIB.

Beam switching indications for a CORESET may be group-based. In some embodiments, WTRUs located in similar geographical locations and moving in a same or similar direction and speed may be formed as a group. For example, a WTRU may receive an indication to perform grouping, and the WTRU may perform a proximity check to find neighboring WTRUs. The proximity check may be based on a measurement quality of a proximity reference signal. For example, a WTRU may send a proximity reference signal, and the WTRUs that have received the proximity reference signal and for which the measurement quality is higher than a threshold may become part of a same group. In some cases, a group-id may be also indicated with the proximity reference signal. In some cases, a WTRU may be directed or configured to send a proximity reference signal with a group-id.

In some cases, a WTRU that has determined a group-id may perform a group-based beam management operation mode and may stop performing a WTRU-specific beam management operation. The WTRU may inform the gNB about the reception of a proximity reference signal and its associated quality, for example, by providing an RSRP level. Alternatively, a WTRU may inform the gNB of the determined group-id. A gNB may confirm that the WTRU may use a group-based beam management operation mode.

In an embodiment, group-based beam switching based on an associated SSB or CSI-RS may be used. For example, a WTRU may be configured to monitor or measure an SSB with a certain period, and the WTRU may determine an associated SSB in each period. The determined SSB may be used as a beam for one or more configured CORESETs during the period. The PBCH of the determined SSB may include beam reference signal information, such as a TCI state for the CORESETs during the period. Hereinafter, the term SSB may be interchangeably used with SS/PBCH block, SS block, and beam measurement reference signal.

Embodiments directed to inter-cell HST and beam selection are described herein. When a WTRU is moving along the tracks in the train at a high speed, one issue involved may be handing over the WTRU between cells, for example, in an inter-cell M-TRP scenario. Performing a handover at high speed with low latency may bring about challenges regarding measurements, configurations and PDCCH monitoring from different cells with very different doppler shifts. Another problem may be the volume of nearly simultaneous handovers from the WTRUs that are in the same location in the train/wagon. Thus, reducing this kind of signaling overhead is important.

In some embodiments, a WTRU may support multi-TCI state monitoring. In this way, a WTRU may deal with PDCCH from different cells almost instantly. As the WTRU is moving from one TRP cluster to the next, such that the next one pertains to a different cell with a different physical cell ID (PCI), the following cell PCI may be configured for mobility measurements. In some cases, high doppler difference gaps may be required for intra-frequency measurements. In some embodiments, when the gaps are configured, the SMTC may be aligned with the SSB or CSI-RS burst and thus the latency of the cell and beam detection may be optimal.

While the WTRU is performing these measurements, in some embodiments, the gaps may be aligned with the specific PCI-SSB indexes for the beams to be detected, so the WTRU may measure and sweep faster through the beam indexes and have enough samples to make sound decisions into activation of certain TCI states and CORESETs associated to the cells.

In some embodiments, the WTRU may be semi-statically configured with both PCI related inter-cell TCI states that belong to both clusters and also configure conditional handovers that would be executed based on measurements thresholds and monitor a certain target CORESET/PDCCH group.

In some embodiments, when the SSBs indexes may be equally spread through TRP clusters, the WTRU may start measuring the target PCI related SSBs based on a measurement threshold of the current serving TRP and one or more of its detected SSB index or associated CSI-RS. The target detected PCI/SSB index detection over a certain threshold may automatically imply an activation of an already configured TCI that belongs to the target inter-cell TRP.

In some embodiments, due to high doppler differences between cells in opposite directions, the target handover cell may have its PDCCH specific symbols configured in a time division manner so they are not overlapping in the time domain and thus, the WTRU may receive simultaneously for a certain time both PDCCHs from the serving cell and the handover target cell while applying the correct doppler for each PDCCH. In some cases, one or more symbols may be left free between these two control channels as time required by the WTRU to apply the automatic frequency control (AFC) Doppler correction and automatic gain control (AGC) adaptation.

If the network is fully synchronized in terms of slot and frame border to allow common WTRU processing at the symbol/slot level, the overlapping PDCCH problem may be completely avoided in the time domain. In some embodiments, once the WTRU has received/decoded correctly the target cell PDCCH, and subsequently a PDSCH transmission, it may signal handover completion to the network or simply start acknowledging the PDSCH transmissions from the target cell. Upon reception of an ACK or CSI feedback for the target cell, the network may consider the handover complete. A subsequent configuration for the next cell may be sent to the WTRU with a following target cell.

In some embodiments, a WTRU may receive multiple target cells in a suite of conditional handovers in a single RRC message, meaning a certain number of cells/SSBs may be configured in order. The WTRU may cycle through such configurations and conditionally perform all the handovers. The WTRU may do so without other single cell based semi-static configurations and only a sequence of cells and attached thresholds, SSB indexes and PCTs. In embodiments, conditional handovers may reduce dramatically the amount of layer 2/3 signaling. Similarly, the required WTRU measurements objects may be organized in a sequence, so the WTRU may execute optimally only the next target cell related measurements, reducing the power consumption and the cell/beam index detection time, which may both be critical in the HST scenario.

In some embodiments, an improved CSI framework may be applied in the HST context. In NR, the CSI framework may operate based on three main configuration objects: CSI-ReportConfig, CSI-ResourceCon fig, and a list or lists of trigger states. A HST WTRU may be configured such that one or more CSI configuration objects depend on an HST zone or TRP. Furthermore, one or more detailed configurations in each object may depend on a zone or TRP.

In some embodiments, a WTRU may be configured with a CSI-ResourceConfig containing multiple resource settings and each setting may be linked to a zone or a TRP. A WTRU may be configured to perform CSI measurements on the configured resources once the WTRU detects a corresponding zone or TRP beam.

In some embodiments, a WTRU may be configured with a CSI-ReportConfig containing multiple report settings, and each setting may be linked to a zone or a TRP. A WTRU may be configured to report CSI according to the configured report setting once the WTRU detects a corresponding zone or TRP beam.

In some embodiments, a WTRU may be configured with a list of triggered states where each state may be linked to a zone or a TRP. A WTRU may be configured to employ a configured trigger state once the WTRU detects a corresponding zone or TRP beam.

A CSI-RS configuration may employ a same set of RSs for all segments. A CSI-RS configuration may have more than one CSI-RS set such that each set may be used by TRPs based on a predefined or configurable pattern, such as in an alternating pattern.

The linkage between a configuration object and a zone or TRP may be indicated in an implicit or an explicit manner. In an implicit indication, a WTRU may determine that the CSI configuration corresponds to a zone or TRP according to a broadcast indication or a common control indication. In one such embodiment, a WTRU may be configured with a common CORSET dedicated for all HST WTRUs. For example, an HST CORESET may be used to receive all relevant information for all WTRUs in the zone. If an HST CORESET is not configured, a WTRU may use CORESET 0 to obtain the HST zone and TRP information. In some cases, an HST CORESET may indicate the identity of the current zone or TRPs and some additional related information, such as a number of TRPs in the zone.

In some embodiments, a WTRU may be configured with a list that relates the configurations of CSI configuration objects as an index to a zone. This list may be combined with a TCI information vector.

CSI-RS reporting may be performed in an efficient manner. In a HST scenario, many WTRUs may be grouped under the same mobility condition, and hence they may all experience and share a very similar high Doppler or short coherency time for their corresponding wireless channels. In an HST scenario with many WTRUs, a high rate of CSI reporting per WTRU may not be feasible due to an excessive increase in feedback overhead and system resource usage.

It may be advantageous that CSI feedback is restricted to report components of Doppler information, such as Doppler spread and Doppler frequency, that will be valid for the duration of stationary time of the channel that is longer than its coherence time. As such, the rate of the CSI report may be reduced significantly. However, in HST scenarios with hundreds of WTRUs per car, even a CSI reporting at a lower rate corresponding to a stationary time of the channel may consume a significant percentage of resources. Since Doppler information for all WTRUs in an HST may experience a same Doppler effect, not all WTRUs may need to report their Doppler CSI, and a Doppler CSI report from only a selected number of WTRUs may be sufficient.

A WTRU may be configured to report its CSI information, for instance, Doppler information, on behalf of other WTRUs in an HST car. A WTRU may use one or more of the following mechanisms to report its CSI. For example, in some cases, a WTRU may be configured with a set of CSI-RS resources, and it may report its CSI reports based on a random function. As the number of WTRUs in a HST car may vary, the WTRU may be configured with additional parameters to bias the random function according to the stationary time of the channel and to maintain a reasonable rate of collision with reports from other WTRUs. In some cases, a WTRU may be configured to report its CSI information, for instance, Doppler information, only in certain zones that are preconfigured by a list. The configuration may also include CSI resource configuration per zone. In other cases, a WTRU or a group of WTRUs may be triggered to report their CSI information, for instance, Doppler information, only when indicated by a common DCI or MAC-CE. In case of a group call, WTRUs may use the same or different CSI resources for measurement purposes.

CSI-RS configurations for multiple TRPs are may be reused. CSI-RS resources may be used for beam management procedures where the CSI-RS are beamformed to different directions, or they may be used for codebook or non-codebook based precoding. To avoid excessive RRC reconfiguration overhead as the WTRU rapidly moves from one TRP to another, a common CSI-RS configuration may be configured jointly for a group of TRPs. For example, the TRPs may be arranged along a train track such that the same beam direction may be reused at each TRP. The beam directions may be preconfigured based on the geographical placement of TRPs relative to the train movement. The WTRU may assume the same set of beam directions are available for all TRPs with the same CSI-RS configurations.

The same CSI-RS configurations may be reused for all TRPs with a parameter as part of the CSI-RS configuration indicating the valid set of TRPs. The valid set of TRPs may be indicated in accordance with one or a combination of factors. For example, the valid set of TRPs may be indicated by a list of TRP indices. As the WTRU moves and detects TRPs, the WTRU may determine if the TRP index belongs to the valid set of TRPs for which the CSI-RS configuration is configured.

The valid set of TRPs may be indicated by a zone index which represents of a zone of track. The zone index may be linked with a set of TRPs belonging to a same geographical area. The zone index may be included as part of the CSI-RS configuration and the WTRU may determine the valid CSI-RS configurations based on its geographical location, determined via GPS signaling, for instance, and may link it to the TRPs belonging to the geographical area.

The valid set of TRPs may be indicated by a validity period. A WTRU may detect a TRP with a CSI-RS configuration and an associated timer; the WTRU may determine after it detected the TRP that the same CSI-RS configuration may be applied for all subsequent TRPs detected within the validity period, which may be the duration of a trip. After expiration of the timer, a different CSI-RS configuration may be linked to apply for the next set of TRPs. A WTRU may be configured with multiple CSI-RS configurations, which may be linked each with their own timers, such that the WTRU may determine one configuration to be valid after the expiration of a timer of another configuration.

A CSI-RS configuration may be associated with more than one CSI-RS sets, and each set may be active according to a pattern. The WTRU may restrict its monitoring to only the active CSI-RS sets, and each TRP may not need to signal to the WTRU which set is active if the WTRU is preconfigured with the pattern. The pattern may consist or may be comprised of a sequence of TRPs where each set is active, a sequence of geographical areas indicating which set is active in which area, or a timer associated with each set determining the period of time during which the set is active.

Figure 5:
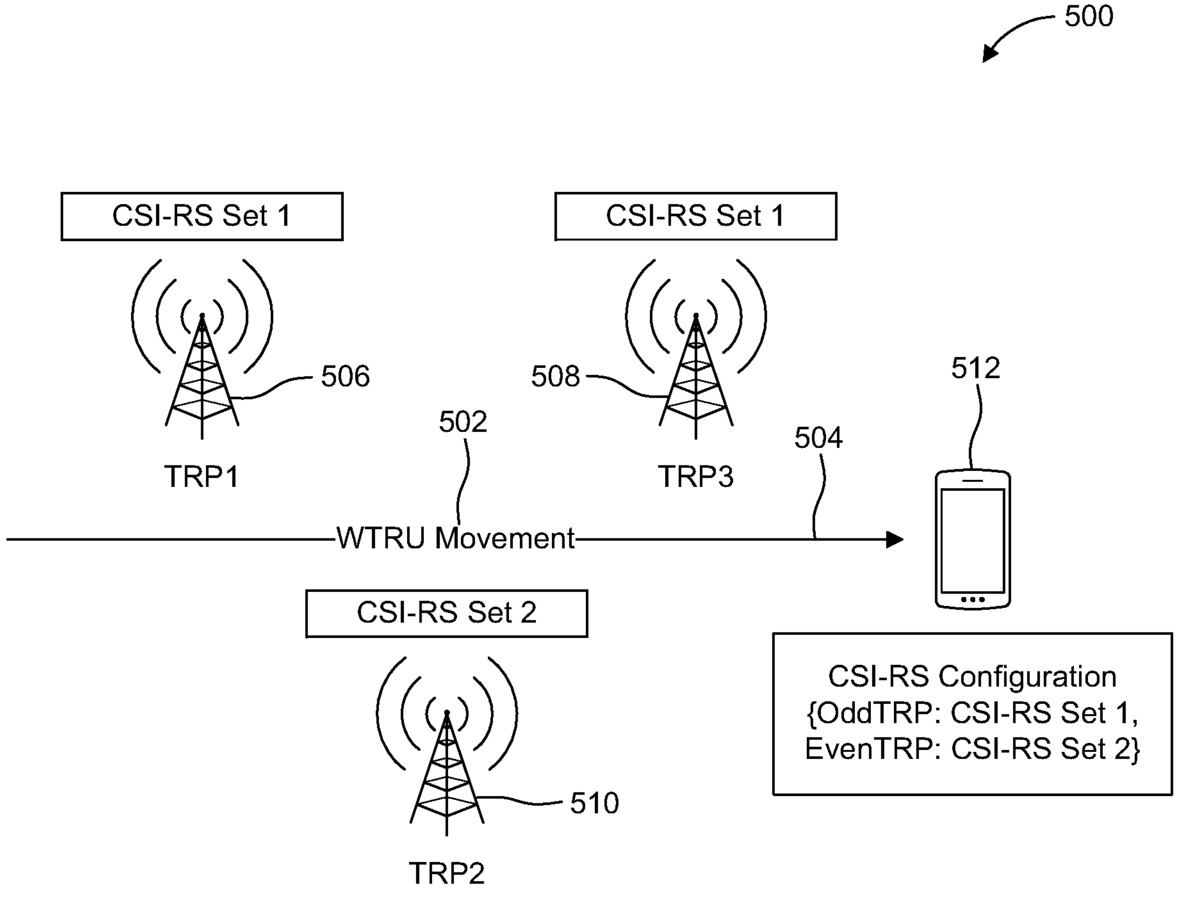
FIG. 5 shows an example scenario in which, odd numbered TRPs are located north of a track with beams pointing south, and even numbered TRPs are located south of the track with beams pointing north.

FIG. 5 shows WTRU movement 502 along a track 504. In the example shown, odd numbered TRPs including TRP1 506 and TRP3 508 may be located north of the track 504. TRP1 506 and TRP3 508 may have beams pointing south. Even numbered TRPs, including TRP2 510, may be located south of the track with beams pointing north. A pattern may be configured at the WTRU 512 to indicate that one CSI-RS set may be active for odd numbered TRPs, whereas other CSI-RS sets may be active for even numbered TRPs. The WTRU may adjust its receive/transmit beam according to the TRP index detected as the WTRU moves. For example, the WTRU may be facing the side with odd TRPs and the WTRU may determine to activate only its panel facing the odd TRPs. Alternatively or in combination, TRP1 506 and TRP3 508 may be configured to a same geographical area, and TRP2 510 may be configured to a different area. When a WTRU enters the geographical area of TRP2 510, the WTRU may determine to change its spatial transmit/receive filter to match the CSI-RS configurations active in the geographical area of TRP2 510.

CSI-RS resources may be triggered on a TRP which is different from where the triggering signal is sent. With the WTRU moving at high speed, there may not be sufficient time for one TRP to send a control signal triggering an aperiodic CSI-RS and for the WTRU to send the CSI-RS before the WTRU moves on. Moreover, the WTRU may need some time after reception of the triggering message to adjust its transmission configuration, for example, by activating or deactivating panels, or changing beams. An aperiodic CSI-RS resource may be triggered by a control signal on one TRP, while the aperiodic CSI-RS resource may be sent on another TRP. The triggering control signaling may include a TRP index indicating the TRP which may send the AP-CSI-RS; an offset index n indicating a TRP with index offset by n from the triggering TRP that may send a CSI-RS; or a TCI state of the TRP sending the AP-CSI-RS. The TCI states may be different from the TCI state of the triggering message. The WTRU may determine from the triggering message that it may adjust its transmit/receive filter according to the TCI of the TRP sending the AP-CSI-RS.

The WTRU may assume that the triggering TRP and the TRP sending the CSI-RS use the same CSI-RS configuration, for example, the same number of ports, number of CSI-RSs and the like. The aperiodic triggering may be carried out by a DCI or a MAC CE. For example, in FIG. 5, TRP1 506 may send a DCI to the WTRU triggering an aperiodic CSI-RS transmission and the DCI may contain the index of TRP3 508. The CSI-RS may be triggered to be sent on TRP3 508. The WTRU may determine to activate its panel to receive CSI-RS set 1 when it approaches TRP3 508. The WTRU may also be configured with a set of TRPs for which TRPs may be sending aperiodic CSI-RS. The triggering message may include a list of TRPs which may be activated. The WTRU may determine as it moves through various TRPs that it may receive multiple aperiodic CSI-RS without needing individual triggering messages from each TRP.

The WTRU may be triggered to send a CSI report on a different TRP than on the TRP from which the CSI-RS resources were sent. The WTRU may determine the TRP to send the CSI report based on an index contained in the triggering message such as a TRP index or an offset index indicating the offset between TRP sending the triggering and the TRP receiving the report. The WTRU may also be configured with a set of TRPs for which the WTRU may send the report. If the WTRU determines that it is to be served by TRPs that are not in the valid set, the WTRU may omit sending the CSI report. Similarly, the WTRU may be triggered to send SRS resources to a different TRP than the TRP sending the triggering signal. The TRP index may be included with the triggering signal. The WTRU may determine which panel and which SRS resources to send at what time based on the TRP index included in the triggering signal.

An efficient reference signal transmission may be employed in embodiments. In NR, to assist a WTRU in tracking gNB frequency and timing, a WTRU may be configured to receive tracking reference signals. If needed, a WTRU in RRC connected mode may receive the higher layer WTRU specific configuration of a NZP-CSI-RSResourceSet configured with higher layer parameter trs-Info. Depending on WTRU location with respect to a transmission point, a WTRU may experience different levels of Doppler shift. A high speed WTRU may experience the fastest rate of change in Doppler shift when it is in relative proximity of a transmission point. Since a higher Doppler shift may need a higher rate of TRS transmission, a WTRU may be configured to receive and process TRS with a variable transmission rate.

In some embodiments, a TRS pattern may be location based. In an embodiment, a multi-TRP transmission deployment, for example, in a high speed train scenario, may be divided to multiple zones. A WTRU may receive a configuration to expect a TRS transmission with a different periodicity in each zone. In an exemplary embodiment, the zone between every two TRPs may be divided into more than one zones, for example, two, three or more zones, where the first and third zone may represent areas in the vicinity of a first and a second TRP, and the second may represent the area relatively far from either TRP. In this case, a WTRU may be configured to receive a TRS with one set of transmission properties, for example, higher periodicity, in the first and the third zones, and with another set of transmission properties, for example, lower periodicity in the second zone. In an embodiment, a WTRU may indicate its presence in a zone based on using different SRS transmission resources.

A WTRU may be always configured to operate with either a lower or a higher TRS transmission periodicity, and may then be indicated to operate in the other mode when needed.

In some embodiments, a TRS pattern may be dynamically indicated. A WTRU may be configured with more than one TRS configuration, where each configuration has a preconfigured TRS density in time. A WTRU may be indicated dynamically, e.g., a DCI or a MAC CE, to alternate between the two configurations. For example, a WTRU may receive a single bit in a DCI to indicate the preferred TRS pattern. In some cases, a WTRU may be indicated implicitly to use a TRS configuration other than one used for the scheduled transmission. For example, the WTRU may use one configuration for a lower MCS while using another for a higher MCS.

In some embodiments, a WTRU may be configured with more than one TRS configuration, where each may have a similar TRS density in time, but each may have different time offsets. A WTRU may be indicated to expect one or more TRS transmissions if needed.

In some embodiments, non-uniform TRS patterns may be used. A WTRU may be configured with a TRS configuration for which its resource allocation is not spread uniformly over time. In an embodiment, a WTRU may be configured with a TRS resource allocation pattern that may be defined over several slots. This may be referred to as a TRS frame. The number of slots per TRS frame may be configured according to WTRU speed. In a TRS frame, the TRS density in time is not uniform and it is higher than in certain slots than others. A TRS transmission with a non-uniform pattern may be activated/triggered in an aperiodic fashion. A WTRU may expect to start receiving TRS at a higher density based on a measurement or criterion. A TRS frame may be restarted, for example, every time a measurement or criterion is met.

In some examples, a WTRU may be configured with a TRS pattern that has a higher density in the middle of the pattern. In some examples, a WTRU may expect a reset or a restart of the TRS frame, when a measurement on its serving TRP, for example, an RSRP, reaches a threshold. Alternatively, or additionally, a WTRU may expect a reset or a restart of the TRS frame after when a measurement on its serving TRP is within a preconfigured range relative to the second TRP, e.g., RSRP1, is within x dB of RSRP2, where x is a configurable value. In some examples, a WTRU may reset or restart the TRS frame based on its geographical location.

In some embodiments, TRS triggering mechanisms may be used. For example, a triggering TRS transmission or TRS transmission with a higher density may be based on a WTRU or gNB determination. In a WTRU-based embodiment, a WTRU may request initiation of a TRS transmission or request for a TRS transmission with a higher density based on several criteria. For example, a WTRU may perform a downlink measurement, e.g., RSRP, CQI, Doppler, etc. Alternatively or additionally, a WTRU may proceed with such request based on its determined location.

In a gNB-driven embodiment, a gNB may use a different TRS configuration based on an uplink measurement. In an embodiment, a WTRU may be configured with multiple SRS configurations where each may be associated to a TRS configuration. The association may be implemented through an RRC, MAC CE, DCI or a combination thereof. A WTRU may be configured to perform an SRS transmission using a default SRI where the default SRI may be associated with a default TRS configuration. Based on an SRS transmission of a WTRU, a gNB may determine the required TRS configuration and may indicate the preferred TRS mode by an SRI. A WTRU may determine the new TRS configuration by the received SRI.

In some embodiments, such as in a high speed train scenario, where there are many WTRUs experiencing a same Doppler, when a TRP successfully receives one request from a WTRU, the TRP may change a TRS periodicity for all WTRUs. Therefore, a WTRU may not expect to receive a dedicated response to its own request. A WTRU may expect an indication for this purpose or other similar situation where it involves all WTRUs in a train, to be received in a common search space where the DCI may be scrambled with a unique RNTI targeting all WTRUs in a train. Alternatively or additionally, a WTRU may not expect any response once it determines a change in its TRS configuration.

In some embodiments, a WTRU may receive a specific identification and configuration to be a designated WTRU to represent other WTRUs in a train. A WTRU may receive a configuration to become a designated WTRU semi-statically or dynamically. A WTRU may be configured to act as a designated WTRU only in certain slots, radio frames, etc. A designated WTRU may be assigned a specific RNTI and other dedicated configuration, e.g., SRS, PUCCH, PUSCH and SR configurations. An eNB may indicate the designated WTRU based on whether or not the designating WTRU is transmitting data above a priority, whether or not the WTRU has a high battery power or the like.

In some embodiments, assuming the existence of sidelink operation as in the operation in V2V communication, a designated WTRU may help the network to update positioning information of other WTRUs in its vicinity.

In some embodiments, a WTRU may support aperiodic TRS and/or semi-persistent TRS, which may be associated with periodic TRS. Hereafter, the term aperiodic TRS may be interchangeably used with the terms semi-persistent TRS and multi-shot TRS. Hereafter, the term TRS resource set may be interchangeably used with the terms TRS resource, CSI-RS resource set, CSI-RS resource, CSI-RS resource set with trs-Info, CSI-RS resource for tracking and/or CSI-RS for tracking. In some embodiments, an association between aperiodic TRS and periodic TRS may be based one or more of RRC signaling, one or more MAC CEs, one or more DCI, and/or any logical equivalent of the aforementioned signaling.

In some embodiments, a WTRU may be configured with aperiodic TRS, periodic TRS and associations between the aperiodic TRS and the periodic TRS via RRC signaling. The association may be based on a TRS resource set ID and/or a QCL type. For example, a periodic TRS resource set configuration may comprise an associated aperiodic TRS resource set ID. One or more QCL types, for example, one or more of QCL type-A, QCL type-B, QCL type-C, QCL type-D, etc., of an aperiodic TRS may comprise an associated periodic TRS resource set ID.

In some embodiments, a WTRU may be configured with aperiodic TRS and periodic TRS (e.g., via RRC). Based on the configurations, the WTRU may receive an association between the aperiodic TRS and the periodic TRS (e.g., via MAC CE). The association may be based on one or more of: a TRS resource set ID; a TCI state ID; or an SSB ID. For example, the WTRU may receive a target TRS resource set ID (e.g., aperiodic TRS resource set ID) and associated TRS resource set ID (e.g., periodic TRS resource set ID) via a MAC CE. Based on the indication, the WTRU may determine the association between the periodic TRS resource set and the associated aperiodic TRS resource set. In some cases, the WTRU may receive a target TRS resource set ID (e.g., aperiodic TRS resource set ID) and associated TCI state ID via MAC CE. Based on the indicated TCI state, the WTRU may determine the associated TRS resource set (e.g., periodic TRS resource set associated with the indicated TCI state). In some cases, the WTRU may receive a target TRS resource set ID (e.g., aperiodic TRS resource set ID) and associated SSB ID via MAC CE. Based on the indicated SSB ID, the WTRU may determine the associated TRS resource set (e.g., periodic TRS resource set associated with the indicated SSB).

In some embodiments, a WTRU may be configured with aperiodic TRS and periodic TRS (e.g., via RRC). Based on the configurations, the WTRU may receive an association between the aperiodic TRS and the periodic TRS (e.g., via DCI). The association may be based on one or more of: an aperiodic TRS trigger; a TRS resource set ID; a TCI state ID; or an SSB ID. In some embodiments, for example, an aperiodic TRS trigger configuration (e.g., via RRC) may comprise one or more pairs of an aperiodic TRS resource set to be triggered and an associated periodic TRS resource set. When the WTRU receives an aperiodic TRS trigger with the aperiodic TRS trigger configuration, the WTRU may receive the aperiodic TRS resource set associated with the associated periodic TRS resource set. In some embodiments, for example, the WTRU may receive a target TRS resource set ID (e.g., aperiodic TRS resource set ID) and an associated TRS resource set ID (e.g., periodic TRS resource set ID) via DCI. Based on the indication, the WTRU may determine the association between the periodic TRS resource set and the associated aperiodic TRS resource set. In some embodiments, for example, the WTRU may receive a target TRS resource set ID (e.g., aperiodic TRS resource set ID) and associated TCI state ID via DCI. Based on the indicated TCI state, the WTRU may determine the associated TRS resource set (e.g., periodic TRS resource set associated with the indicated TCI state). In some embodiments, for example, the WTRU may receive target TRS resource set ID (e.g., aperiodic TRS resource set ID) and associated SSB ID via DCI. Based on the indicated SSB ID, the WTRU may determine the associated TRS resource set (e.g., periodic TRS resource set associated with the indicated SSB). The DCI may be based on one or more of: a WTRU specific DCI; an uplink DCI; a downlink DCI; a sidelink DCI; and/or a group DCI.

It should be understood that the signaling of aperiodic TRS and/or periodic TRS, as well as the association between the aperiodic TRS and the periodic TRS may be provided by a logical equivalent of the RRC signaling, MAC-CE, or DCI.

In some embodiments, a WTRU may request one or more preferred parameters for an aperiodic TRS resource set and/or an aperiodic TRS transmission to a gNB. The request (e.g., via one or more of PUCCH, PUSCH and MAC CE) may be based on one or more of an indication of an explicit value or an indication of a value based on configured/predefined candidates.

The WTRU and the gNB may determine the application of the reported parameters based on one or more factors. Such factors may include a processing time X which may be provided from the WTRU via a request. For example, the WTRU may apply the one or more parameters for aperiodic TRS transmission after processing time X. Another factor may be a time period receiving gNB confirmation. For example, the WTRU may receive a confirmation from gNB for the WTRU report. Based on the confirmation, the WTRU may apply the one or more parameters for aperiodic TRS transmission. In some embodiments, the confirmation may be PDCCH transmission in a CORESET and/or the CORESET may be a dedicated CORESET for aperiodic TRS parameter change confirmation.

Parameters for aperiodic TRS may include one or more of: periodicity; offset; consecutive slots; CSI-RS density; frequency band; power control offset; or a number of transmissions (e.g., number of TRS transmission with consecutive slots).

In an embodiment, a WTRU may receive a triggering of, an activation of or a deactivation of an aperiodic TRS based on a DCI and/or a MAC CE. The DCI may include an aperiodic TRS triggering field. For example, the WTRU may receive a trigger based on an aperiodic TRS triggering field. The DCI may include a TRS resource set ID. For example, the WTRU may receive a TRS resource set ID via DCI. Based on the indication, the WTRU may trigger, activate or deactivate the aperiodic TRS resource set. The DCI may include a TCI state ID. For example, the WTRU may receive a TCI state ID via DCI. Based on the indicated TCI state, the WTRU may determine the associated TRS resource set (e.g., an aperiodic TRS resource set associated with the indicated TCI state). The DCI may also include an SSB ID. For example, the WTRU may receive an SSB ID via DCI. Based on the indicated SSB ID, the WTRU may determine the associated TRS resource set (e.g., aperiodic TRS resource set associated with the indicated SSB). The DCI may include an activation/deactivation field. For example, the WTRU may receive an indication of activation and/or deactivation via DCI. Based on the indication, the WTRU may activate and/or deactivate the indicated one or more TRS resource sets. The DCI may be one or more of: a WTRU specific DCI; a downlink DCI; an uplink DCI; a sidelink DCI; and/or a group DCI. A PDCCH comprising the DCI field may be scrambled with a specific RNTI for aperiodic TRS trigger.

A MAC CE triggering activation or deactivation of an aperiodic TRS may include one or more of several identifiers. For example, the WTRU may receive a TRS resource set ID via a MAC CE. Based on the indication, the WTRU may trigger, activate or deactivate the aperiodic TRS resource set. In some embodiments, the WTRU may receive a TCI state ID via a MAC CE. Based on the indicated TCI state, the WTRU may determine the associated TRS resource set (e.g., aperiodic TRS resource set associated with the indicated TCI state). In some embodiments, the WTRU may receive an SSB ID via a MAC CE. Based on the indicated SSB ID, the WTRU may determine the associated TRS resource set (e.g., aperiodic TRS resource set associated with the indicated SSB). In some embodiments, the WTRU may receive an indication of an activation and/or a deactivation via MAC CE. Based on the indication, the WTRU may activate and/or deactivate indicated one or more TRS resource sets. In some embodiments, the MAC CE message may be identified based on a specific logical channel ID. In some embodiments, a WTRU may request aperiodic TRS transmission based on one or more of a TRS resource set indication and/or a WTRU measurement of Doppler shift. The TRS resource set indication may be based on one or more identifiers. For example, the WTRU may receive a TRS resource set ID via a MAC CE. Based on the indication, the WTRU may trigger/activate/deactivate the aperiodic TRS resource set. In some embodiments, the WTRU may receive a TCI state ID via a MAC CE. Based on the indicated TCI state, the WTRU may determine the associated TRS resource set (e.g., aperiodic TRS resource set associated with the indicated TCI state). In some embodiments, the WTRU may receive an SSB ID via a MAC CE. Based on the indicated SSB ID, the WTRU may determine the associated TRS resource set (e.g., aperiodic TRS resource set associated with the indicated SSB).

It should be understood that the signaling TRS resource sets, TRS resource set indications, TRS configurations and/or configuration information may be provided via a logical equivalent of the RRC signaling, MAC-CE, or DCI.

In embodiments where the WTRU requests aperiodic TRS transmission based on a Doppler measurement, the WTRU may report one or more values of parameters (e.g., Doppler shift, Doppler spread, average delay, delay spread and etc.) to a gNB. Based on the report, the WTRU may receive an aperiodic TRS resource set. For example, if the reported one or more values are larger than a threshold, the WTRU may receive (the gNB may transmit) aperiodic TRS resource set. In some cases, if the reported one or more values are smaller than (or equal to) the threshold, the WTRU may not receive (the gNB may not transmit) aperiodic TRS resource set. The WTRU may indicate resource set index for the measurement (e.g., TRS resource set ID) to the gNB.

In some embodiments, the WTRU and the gNB may determine the transmission of the requested aperiodic TRS based on a time offset X from the WTRU request and/or based on reception of confirmation from a gNB. For example, in some cases the WTRU may receive the aperiodic TRS transmission after time X (e.g., ms, slots, symbols and etc.) from the request. In some cases, the WTRU may receive a gNB confirmation for the WTRU request. Based on the confirmation, the WTRU may receive the aperiodic TRS transmission. The confirmation may be, for example, a PDCCH transmission in a CORESET. The CORESET may be a dedicated CORESET for aperiodic TRS request from the WTRU.

A TRS and SRS may be estimated, measured, determined and/or reported in an aperiodic fashion. In some embodiments, a WTRU may estimate, measure, and/or determine the Doppler frequency related information and report the Doppler frequency related information when one or more predefined conditions are met. Hereafter, Doppler frequency may be interchangeably used with frequency offset. One or more of following circumstances may apply. For example, the Doppler frequency related information may be at least one of a Doppler frequency value (e.g., frequency offset value), a Doppler frequency change rate ($\Delta_{DF}$), or a sign of the Doppler frequency (e.g., positive or negative). The Doppler frequency change rate may be determined based on one of more of the following parameters. For example, the Doppler frequency rate may be expressed as $\Delta_{DF}=(\Delta_{F1}-\Delta_{F2})/\Delta_T$. Here, $\Delta_{F1}$ may be a first Doppler frequency at $T_1$, $\Delta_{F2}$ may be a second Doppler frequency at $T_2$, and $\Delta_T$ may be a time gap between $T_1$ and $T_2$ (e.g., $\Delta_T=T_2-T_1$).

The predefined condition may be at least one of following: the Doppler frequency change rate is higher than a threshold; the sign of the Doppler frequency is changed; or the Doppler frequency value is higher than a threshold.

A WTRU may be indicated, configured, or determined to estimate the Doppler frequency change rate periodically, and the periodicity of the Doppler frequency change rate estimation may be determined based on one or more of a configuration, a location of the WTRU or the speed of the WTRU. For example, a WTRU in a first geographical location (e.g., first zone) may estimate the Doppler frequency change rate with a first periodicity and a WTRU in a second geographical location (e.g., second zone) may estimate the Doppler frequency change rate with a second periodicity. The periodicity may be shorter for the WTRU in a geographical location which is closer to the boundary of two TRPs. In another example, a WTRU in a first speed may estimate the Doppler frequency change rate with a first periodicity and a WTRU in a second speed may estimate the Doppler frequency change rate with a second periodicity A set of uplink resources may be configured to report Doppler frequency related information when one or more predefined conditions are met. The set of uplink resources may be a periodic PUCCH resource. The WTRU may send a Doppler frequency change related information in a configured uplink resource when one or more of predefined conditions are met. Otherwise, the configured uplink resource may be unused.

The Doppler frequency related information may be at least one of: an aperiodic TRS and/or SRS request for frequency offset pre-compensation; a high Doppler frequency change indication; Doppler frequency change rate related information (e.g., $\Delta_{DF}$); proximity to the boundary of two TRPs; or proximity to a certain zone (or TRP).

In some embodiments, one or more SRS resources may be configured and a WTRU may transmit an SRS in the one or more configured SRS resources when at least one of following conditions is met: the Doppler frequency change rate is higher than a threshold; the sign of the Doppler frequency is changed; or the Doppler frequency value is higher than a threshold.

In some embodiments, there may be an association between TRS and SRS operations. In some embodiments, a WTRU may support a TRP-based frequency offset pre-compensation scheme.

Figure 6:
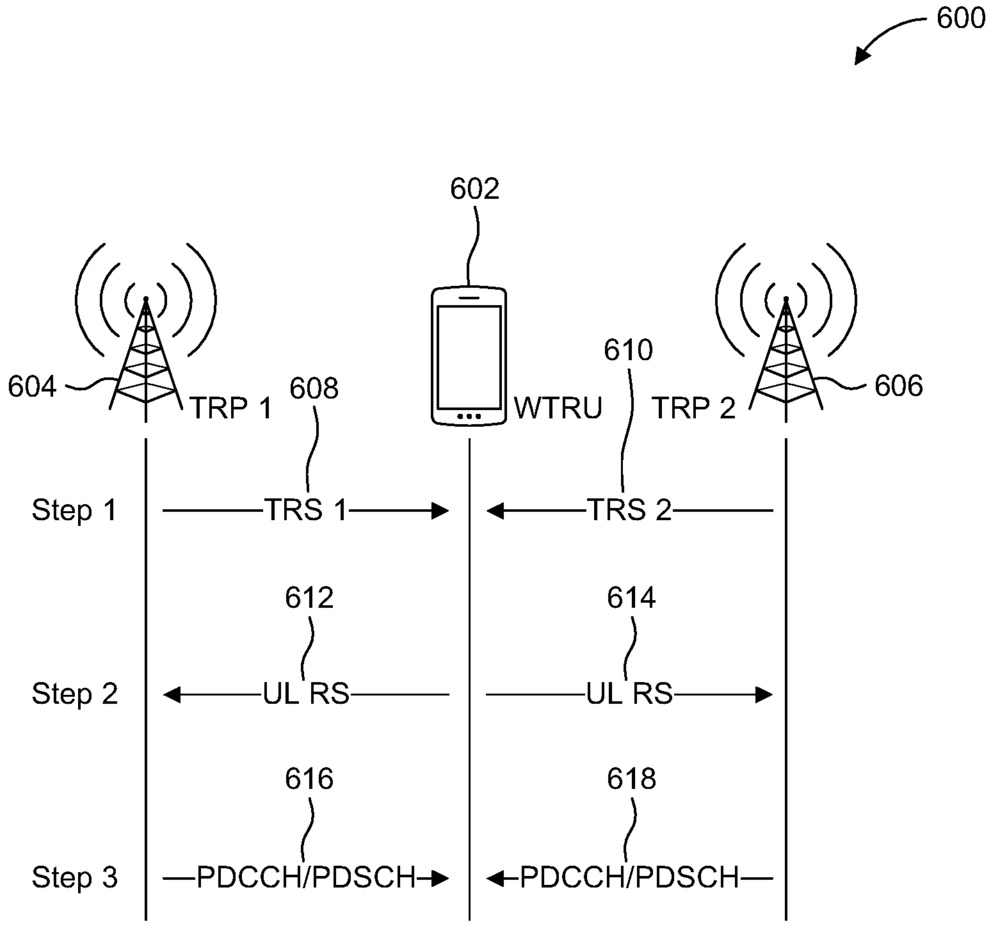
FIG. 6 depicts an example of a TRP-based frequency offset pre-compensation scheme

FIG. 6 depicts an example of a TRP-based frequency offset pre-compensation method 600. Shown in FIG. 6 is a WTRU 602 and two TRPs including a first TRP 604 and a second TRP 606. The WTRU 602 may receive and measure a first TRS resource set 608 from the first TRP 604 and a second TRS resource set 610 from the second TRP 606. Based on the reception and the measurement, the WTRU 610 may determine a TRP for a transmission and report the determination based on a transmission of uplink signals (e.g., SRS, PRACH and etc) and/or uplink channels (e.g., PUCCH) in one or more dedicated uplink resources. For example, if the first TRP 604 is determined based on the first TRS resource set 608, the WTRU may transmit the uplink signals and/or the uplink channels 612 in a first uplink resource which is associated with the first TRS reference set 608. If the second TRP 606 is determined based on the second TRS resource set 610, the WTRU may transmit the uplink signals and/or the uplink channels 614 in a second uplink resource which is associated with the second TRP 606. Based on the transmission, the WTRU and a gNB may determine a frequency offset for pre-compensation and transmit/receive PDCCH and/or PDSCH 616-618 to or from a TRP determined among the first TRP 604 or second TRP 606.

The determination of a TRP may be based on, for example, a WTRU measurement. For example, a WTRU may measure one or more values of parameters based on a TRS resource set. Based on the measurement, the WTRU may determine a TRS resource set for the TRP determination. One or more of the following rules may apply. In some embodiments, if the measured one or more values of a TRS resource set are larger than a threshold, the WTRU may determine the TRS resource set. If the measured one or more values are smaller than (or equal to) the threshold, the WTRU may not determine the TRS resource set. In some embodiments, the WTRU may compare the measured one or more values from multiple TRS resource sets. Based on the measurement, the WTRU may determine a TRS resource set, which provides a largest (or a smallest) value, of the multiple TRS resource sets.

The parameters to be measured by the WTRU may be one or more Doppler related parameters (e.g., Doppler shift, Doppler spread, average delay, or delay spread); SINR; distance and/or pathloss; zone; or BRS. With respect to distance, for example, a TRS resource set with shorter distance from the WTRU or lower pathloss may be determined. With respect to the zone, for example, a TRS resource set associated with a zone that the WTRU locates may be determined. With respect to the BRS, for example, a TRS resource set may be determined based on a measurement of an associated BRS resource/resource set. The BRS may be one or more of a CSI-RS resource/resource set, or a CSI-RS for beam management resource/resource set and SSB.

The association between a TRS resource set and an uplink signal and/or an uplink channel may be based on one or more of a gNB configuration, indication or a predefined relationship. In some embodiments, a WTRU may receive a configuration and/or an indication for the association. The association may be configured or indicated based on one or more of following: a TRS resource set ID; an SRS resource/resource set ID; a CORESET/SS group; a higher layer (e.g., MAC, RLC, PDCP, or SDAP layer) index; a TRP ID; a PUCCH resource ID; a PRACH resource ID; or an associated TCI state ID or TCI state group ID. The configuration/indication may be sent or received using one or more of following: an RRC message; a MAC CE; DCI (WTRU specific DCI and/or group DCI); or a system information block (SIB).

In embodiments where an association is based on a predefined relationship, to determine the association, one or more of following parameters may be used: a cell ID associated with the TRS resource set; a TRS resource set ID associated with the TRS resource set; an SSB ID associated with the TRS resource set; a TRP ID associated with the TRS resource set; or configured parameters of the TRS resource set (e.g., periodicity, density, burst, time offset, or frequency offset).

Figure 7:
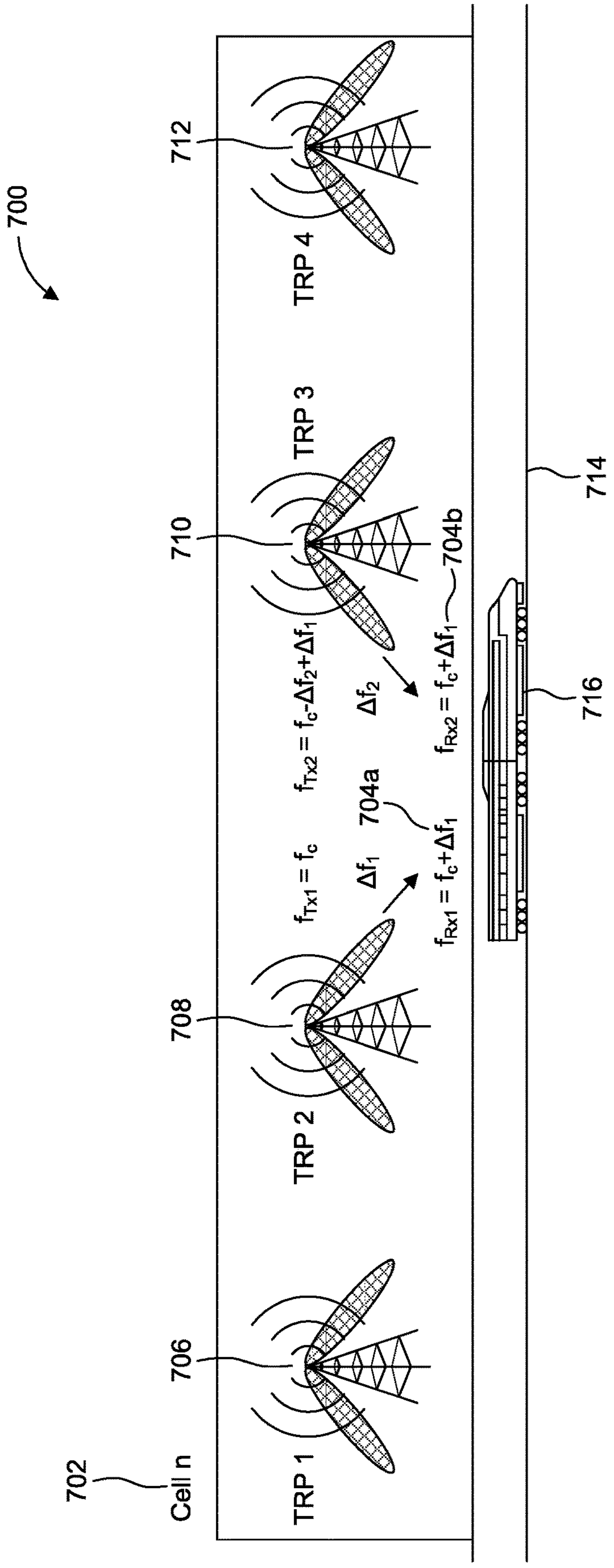
FIG. 7 is an example of an M-TRP SFN transmission with Doppler compensation.

FIG. 7 illustrates an example of an M-TRP SFN transmission 700 with Doppler compensation. In this example, for a cell n 702, four TRPs 706-712 are arranged along a track 714 of which a train 716 may run. In an M-TRP SFN deployment, where M number of TRPs jointly transmit to a WTRU, a WTRU may experience different Doppler shifts from each TRP. These Doppler shifts are denoted as Δf1 704*a* from TRP2 708 and Δf1 704*b* from TRP3 710. When Doppler compensation is performed by the TRPs, for the proper operation of an M-TRP SFN, at least M-1 TRPs may perform Doppler shift pre-compensation so that the received carrier frequencies are matched at the WTRU. An indication of which TRPs may perform or not perform Doppler pre-compensation may be provided dynamically.

In some embodiments, the TRPs to perform Doppler pre-compensation may be selected based on a geographical location or region of the WTRU. To this end, a network may configure a WTRU with a specific SRS resource set or sets to be used, based on its geographical location or the region to which it belongs. The choice of an SRS by the WTRU may indicate the geographical location/region of the WTRU to the network.

In some embodiments, the TRP to perform Doppler pre-compensation may be selected based on channel state information (CSI) measurements at the WTRU. To this end, a reference-signal received power (RSRP), channel quality indicator (CQI), or reference signal received quality (RSRQ) from each TRP may be used. For example, RSRP or RSRQ from each TRP may be tested against certain threshold values or compared. The choice of TRPs to perform Doppler pre-compensation may be made by the network based on the reported RSRP, CQI, or RSRQ measurement sent from the WTRU to the network. In some embodiments, the choice of TRPs may be made at the WTRU and indicated to the network by transmitting SRSs selected from a pre-configured SRS set. The choice of SRS/SRS resource set by the WTRU may indicate the TRPs to perform Doppler pre-compensation.

In some embodiments, to indicate which TRPs should perform Doppler pre-compensation, the network may request an aperiodic or semi-persistent SRS transmission from a WTRU using downlink signaling. For example, when two or more TRPs implement an SFN, a TRP for performing or not performing Doppler pre-compensation may be indicated by the WTRU transmitting an SRS from a pre-configured SRS set, to a particular TRP. In this way, a WTRU may be configured with two different sets of SRS resources, where there is an association between each SRS resource and a TRP. For example, a WTRU may be configured with a first and a second set of SRS resources associated with a first and a second TRP. If the WTRU uses the first SRS resource, the WTRU is indicating a preference for pre-compensation by the first TRP. If the WTRU uses the second SRS resource, the WTRU is indicating a preference for pre-compensation by the second TRP.

In some embodiments, upon reception of an aperiodic trigger for SRS, the WTRU may determine one of a set of possible SRS resources. Each SRS resource from this set may have different characteristics, such as different subcarrier spacing. The WTRU may determine the SRS resource within the set based on a measurement result taken from at least one measurement resource. For example, a measurement result may consist or be comprised of an estimate of time variations of the channel (or Doppler spread) from a reference signal such as TRS or PT-RS. Alternatively or additionally, the WTRU may determine the SRS resource based on an estimate of the WTRU speed from positioning information. For example, the WTRU may select a first SRS resource if the Doppler estimate (or WTRU speed) is below a threshold and a second SRS resource if the Doppler estimate (or WTRU speed) is above a threshold. The threshold and measurement resources may be configured by higher layers for the set of possible SRS resources. The WTRU may report, e.g. in a measurement report, the estimated Doppler, WTRU speed, or selected SRS resource. Such embodiments as this may help the network receive a resource adapted for the estimation of needed Doppler pre-compensation.

SSB configurations may be used for bi-directional transmissions. SSBs may generally be considered as the basis by which a WTRU performs cell/beam detection and measurements. Thus, SSB periodicity may be linked to the reading of a cell's MIB. There may be other RS signals that may be configured on a per WTRU basis or for a set of WTRUs, for example, for mobility as CSI-RS. These RSs may not necessarily be linked to the detection of a cell or cells.

Generally, SSBs may also be used for AFC and AGC. In the context of an HST use case, the WTRU's assumptions regarding these RSs may be important due to their direct impact on demodulation and mobility.

In some cases, the WTRU may always have an anchor TRP, where the doppler effect is effectively evaluated and corrected. The WTRU may indicate through a specific SRS, for example, which TRP is its anchor. Accordingly, other serving TRPs may pre-compensate, or adjust the PDSCH and related DM-RS. Some RS signals may need to be pre-compensated and other RS signals may not need to be pre-compensated from a non-anchor TRP.

Some embodiments may not implement pre-compensation for SSBs. In some embodiments, a non-anchor TRP may not be performing Doppler compensation for any of its SSBs, as these may serve the global mobility for all trains in any direction. Under these embodiments, the non-anchor TRP may use one or more CSI-RSs to perform pre-compensation along with the PDSCH. The non-anchor TRP may be configured per WTRU or group of WTRUs to have CSI-RS related measurements and may provide feedback based on a compensated channel. Moreover, the local in train-car beam mobility under the same non-anchor TRP may be managed under pre-compensated CSI-RS signals. For local beam based mobility, the gNB may configure certain beams with CSI-RSs restricted to certain WTRUs or groups of WTRUs. The CSI-RS may be configured through an RRC message or any other logically equivalent message in a measurement object associated with the serving or neighbor cell. Additionally, or alternatively, the WTRU may derive the allowed beams and their linked CSI-RS or RSs through configured TCI states. When a TCI state is activated, it may contain the indication of what beams may be measured under the same CSI-RS assumptions (e.g., which are QCLed). This way, the WTRU may discriminate between the local mobility beams and non-pre-compensated beam and thus not local mobility allowed. Under this embodiment, the WTRU may be using the SSB for global mobility and doppler estimation, while pre-compensated CSI-RS is used for local mobility and channel feedback. Accordingly, the WTRU may have configured a set of SRS related to the pre-compensated CSI-RS and separately a set of SRS related to the SSB. These SRS sets may be triggered separately periodic in different dedicated timelines or aperiodic through specific DCI commands where the SRS resource type, which may be related to a certain SSB index or CSI-RS index or range or indexes, is indicated. This way, the gNB may measure and act on pre-compensation adjustments correctly.

Some embodiments may implement pre-compensation for SSBs. Some embodiments may involve static grouping of SSBs using SIBs. A non-anchor TRP may compensate a certain number of beams and their associated SSBs based on certain conditions. For example, a cell may indicate in one or more SIBs a certain number of ranges of SSB indexes that may belong to different TRPs under the same cell id. Thus, each TRP belonging to a cell may have a defined range or multiple ranges of reserved SSBs. Under this kind of configuration, different ranges under different TRPs of a cell may be linked. For example, if a WTRU, based on its SSB measurements, selects range 1 for TRP1, it may prioritize SSBs under the range 2 for TRP2. The SSB range linkage may also indicate the QCL assumptions for the SSBs under each TRP and if they are compensated or not. Under this SSB linkage method, a WTRU may use the SSB range for local train-car mobility for measurements priority. Moreover, for example if the TCI configured state indicates an SSB index from a certain range, the WTRU may consider all SSB indexes belonging to the signaled range having the same QCL assumptions.

The SRS resources may be split per SSB ranges and configured by a gNB accordingly, such that the gNB knows exactly what WTRU uses which TRP as an anchor TRP reference and which TRPS are non-anchor TRPs.

Some embodiments may involve semi-static grouping based on SSB index ranges. The SSB range grouping may serve different directions for different trains' users. The pre-compensation of a certain range of SSBs (beams) may be started after a WTRU connection and consequently configured by RRC signaling or another logically equivalent signal. Thus, a dynamic scheme may be envisioned where an SSB range is formed and may be reserved for a certain direction of a WTRU or a group of WTRUs. Consequently, the TCI signaled states will follow the new SSB indexes grouping or reservation. The WTRU may assume that an SSB index has the same QCL properties as all the beams that belong to the same configured range.

Under these embodiments, the dynamic reservation may allow for load balancing and WTRU measurement optimization. Similarly, a TCI state that contains information about the SSBs of a beam may indicate the same assumption for the entire SSB indexes defined range.

Some embodiments may involve signaling opposite beam directions for the SSB. A supplementary indication/split for an SSB index range formed in any of the above cases (SIB, RRC semi-statically or dynamically configured) may be done by indicating opposite beam directions through a direction bit. This signaled direction bit may serve the WTRU beam range sub-grouping under certain similar QCL assumptions where a different direction bit is the QCL discriminator. This beam direction discriminator may be propagated to the SRS index sub-grouping allowing the WTRU to use it correctly in order to serve TRPs under certain beam ranges and/or directions.

A reduced step acquisition mode may be entered into by a WTRU. Since an HST WTRU may be camped on a same cell for an extended period of time, there may not be a change in the cell ID, and it may not require continuous performance of all the steps related to PSS/SSS and PBCH detection. Therefore, a WTRU may enter into the reduced step acquisition (RSA) mode where at least some of the functions related to the SSB detection and decoding process may be skipped.

In some embodiments, a WTRU may be operating in the RSA mode based on one or more of the following conditions. For example, a WTRU may be configured by RRC configuration, or another logically equivalent signal, to operate in the RSA mode. A WTRU may enter into the RSA mode based on an implicit or explicit indication in a received IE in an L1/L2 command. A WTRU may enter into the RSA mode based on an implicit indication through the determination of the usage of a downlink resource, for example, detection of the usage of a specific CSI-RS configuration or TRS. A WTRU may enter into the RSA mode based on a measurement, for example, Doppler shift, Doppler spread, RSRP, SINR, positioning, etc. A WTRU may enter into the RSA mode based on the determination that pre-compensation has not been applied on SSB.

Once in the RSA mode, a WTRU may perform one or more of the following procedures until it exits the RSA mode. A WTRU may store and continue to use the last determined cell identity, MIB, SIB1 PDCCH bandwidth, common CORESET, common SS, etc., that were decoded prior to entering into the RSA mode. The WTRU may start performing measurements on a specific CSI-RS configuration that may be configured for RSA mode, e.g., RSA-CSI-RS. The WTRU may receive RSA-CSI transmissions periodically, or the WTRU may expect reception of RSA-CSI transmissions within a preconfigured window, upon a triggering by WTRU. A WTRU may continue to perform timing/frequency measurements and tracking using configured RSA-CSI-RS configuration. A WTRU may continue to perform beam tracking for beam management using a configured RSA-CSI-RS configuration.

A WTRU may be configured with a set of PDSCH resources, i.e., RSA-PDSCH, to carry some or all of the MIB information, and/or other system information. A WTRU may receive RSA-PDSCH transmissions periodically, or alternatively a WTRU may expect reception of RSA-PDSCH transmissions upon a triggering by the WTRU. The configured RSA-PDSCH resources may also contain some resources to carry some reference signals for timing/frequency tracking.

Downlink transmission schemes for supporting PDCCH transmissions may be used in an SFN deployment.

Some embodiments may enable multi-port PDCCH DM-RSs. For a WTRU to properly receive PDCCH transmissions in a SFN deployment having multiple TRPs, the WTRU may need to perform channel estimation from multiple TRPs separately. However, the current design of PDCCH DM-RS may only enable one DM-RS port. One or a combination of the following approaches may be used to enable multiple DM-RS ports so that the WTRU may perform accurate channel estimation considering PDCCH DM-RSs transmitted from each TRP.

The WTRU may receive a combination of non-zero power and zero-power DM-RSs from each TRP. In each figure, a DM-RS configuration is shown over one or two PRBs in the frequency domain and one slot in the time-domain. Once time-frequency resources for non-zero power DM-RSs are configured for a TRP, the WTRU may receive a power scaled version PDCCH DM-RS from the TRP. Once time-frequency resources for the zero power DM-RS is configured, the WTRU may not receive any DM-RS from the specific TRP.

For the WTRU to process a combination of non-zero power and zero-power DM-RS from each TRP, the gNB may explicitly or implicitly indicate the DM-RS configuration. The indication may be based, for example, on RRC signaling (or another logically equivalent signal), based on which TRS is used for the carrier frequency estimation, based on a TRP ID, or based on a combination of any of these.

Figure 11:
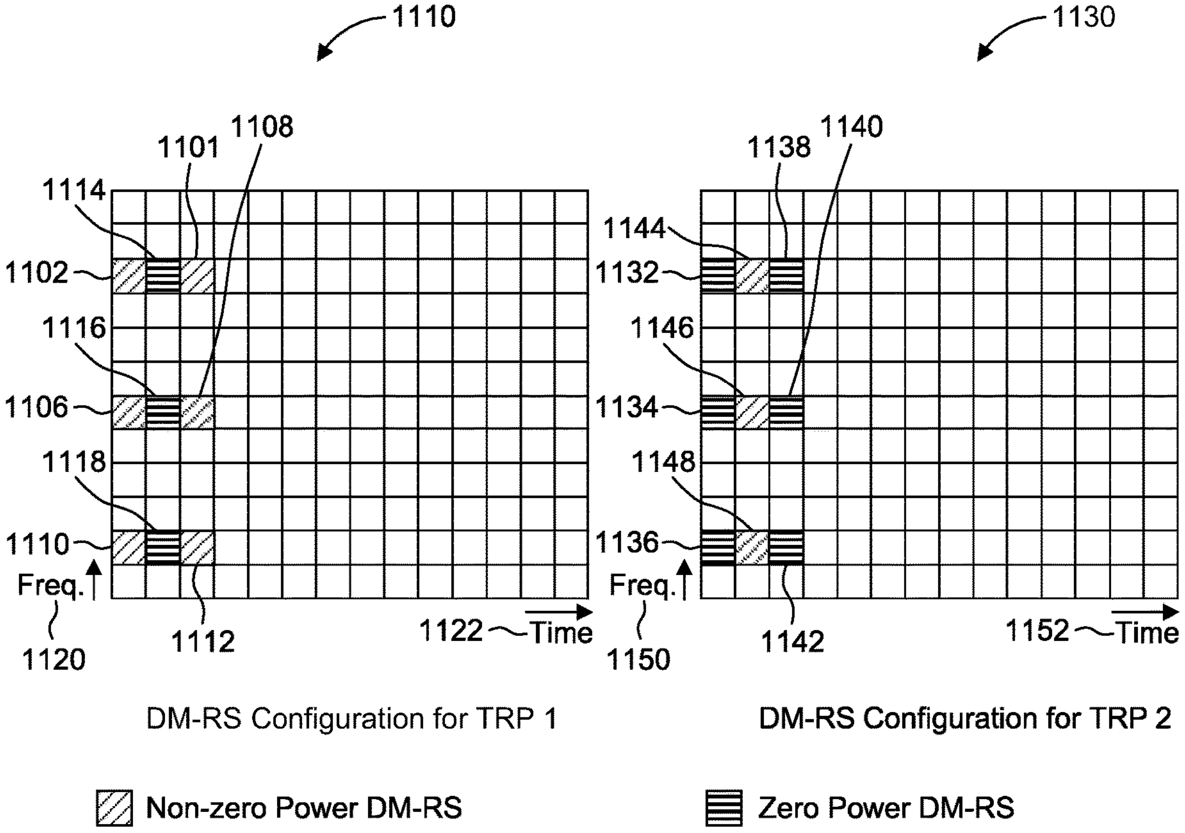
FIG. 11 is an illustration of first zero-power and non-zero power DM-RS configurations for a PDCCH transmission with a 3 OFDM symbol duration.

The WTRU may perform DM-RS estimation considering an orthogonal cover code (OCC) used by each TRP when the PDCCH duration is two OFDM symbols as shown in FIG. 11. In the case the PDCCH duration is three OFDM symbols, the WTRU may use pseudo orthogonal OCC to discriminate between radio signals received from two TRPs. Alternatively, the WTRU may receive DM-RSs with different OCCs applicable for a two symbol duration from both TRPs. Further, the WTRU may receive one additional DM-RS on the third OFDM symbol transmitted by one specific TRP.

The WTRU may perform DM-RS estimation based on the orthogonal/pseudo orthogonal DM-RS signal sequences received from each TRP. To this end, pseudo-random sequence generator may be initialized for each TRP uniquely. For example, when two TRPs transmit PDCCH in a SFN implementation, the PN sequence generation may be initialized by:

$$c_{init} = \left(2^{18}\left(N_{symb}^{slot} n_{s,f} + l + 1\right)(2N_{ID} + 1) + 2^2 N_{ID} + N_{ID}^{TRP}\right) \bmod 2^{31} \text{ where } N_{ID}^{TRP} \in \{0, 1\}$$

which indicates the TRP ID.

Figure 8:
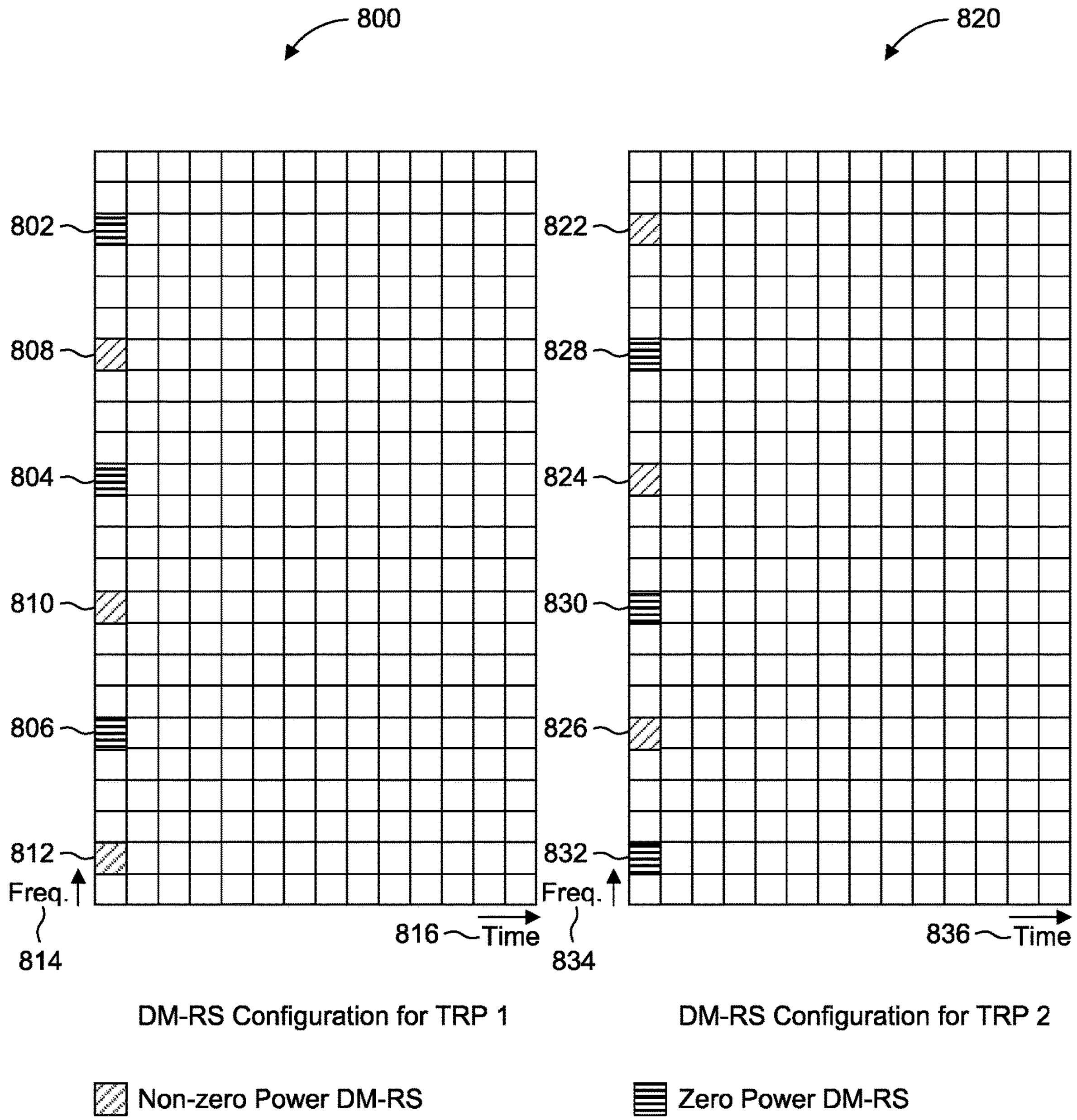
FIG. 8 is an illustration of zero-power and non-zero power demodulation reference signal (DM-RS) configurations for a physical downlink control channel (PDCCH) transmission with a 1 orthogonal frequency division multiplexing (OFDM) symbol duration.

FIG. 8 shows zero-power and non-zero power demodulation reference signal (DM-RS) configurations 800, 820 for a physical downlink control channel (PDCCH) transmission with a 1 orthogonal frequency division multiplexing (OFDM) symbol duration. In an example configuration 800 for a first TRP, zero power DM-RS symbols 802-806 and non-zero power symbols 808-812 may alternate in the frequency domain 814 and occupy only a first symbol in the time domain 816.

In an example configuration 820 for a second TRP, non-zero power DM-RS symbols 822-826 may be alternated with zero power DM-RS 828-832 in the frequency domain 834 while occupying only a first symbol in the time domain 836.

Figure 9:
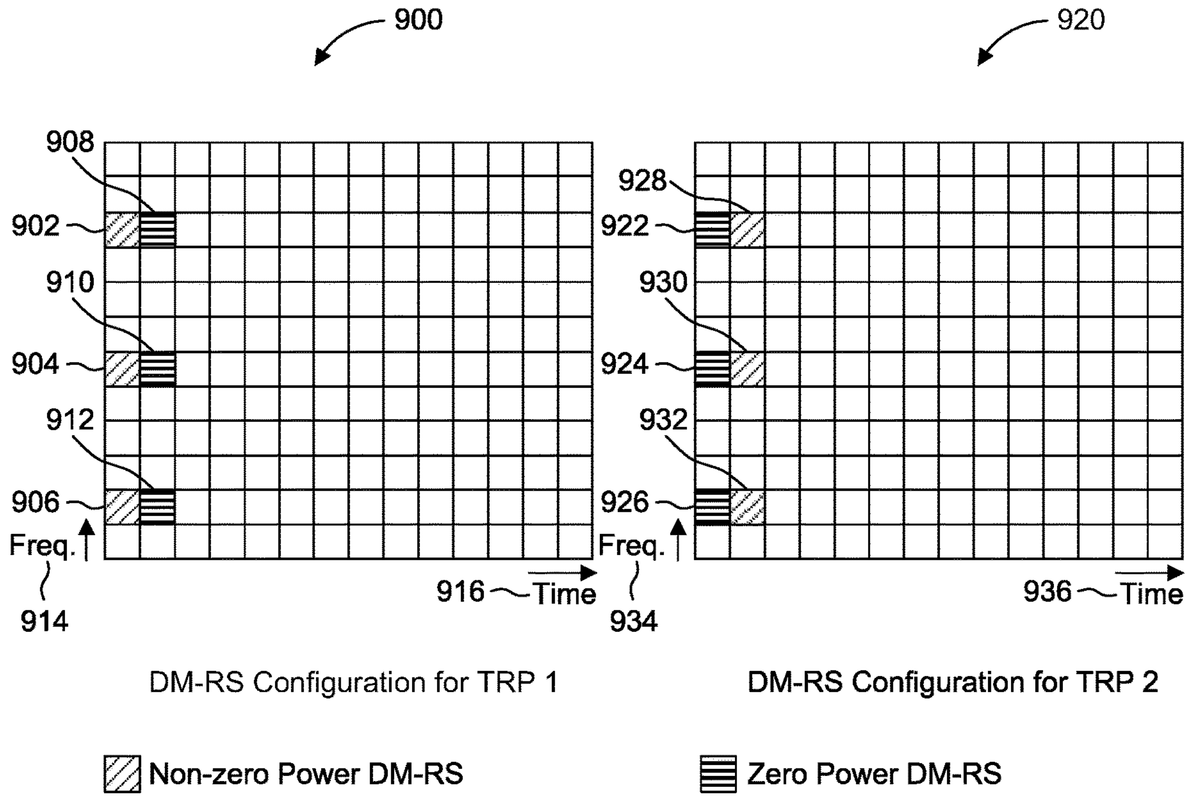
FIG. 9 is an illustration of first zero-power and non-zero power DM-RS configurations for a PDCCH transmission with a 2 OFDM symbol duration.

FIG. 9 shows first zero-power and non-zero power DM-RS configurations 900, 920 for a PDCCH transmission with a 2 OFDM symbol duration. In an example configuration 900 for a first TRP, non-zero power DM-RS symbols 902-906 may precede zero power DM-RS symbols 908-912 in the time domain 916 but may occupy the same resources in the frequency domain 914.

In an example configuration 920 for a second TRP, zero power DM-RS symbols 922-926 may precede non-zero power DM-RS symbols 928-932 in the time domain 936 but may occupy the same resources in the frequency domain 934.

Figure 10:
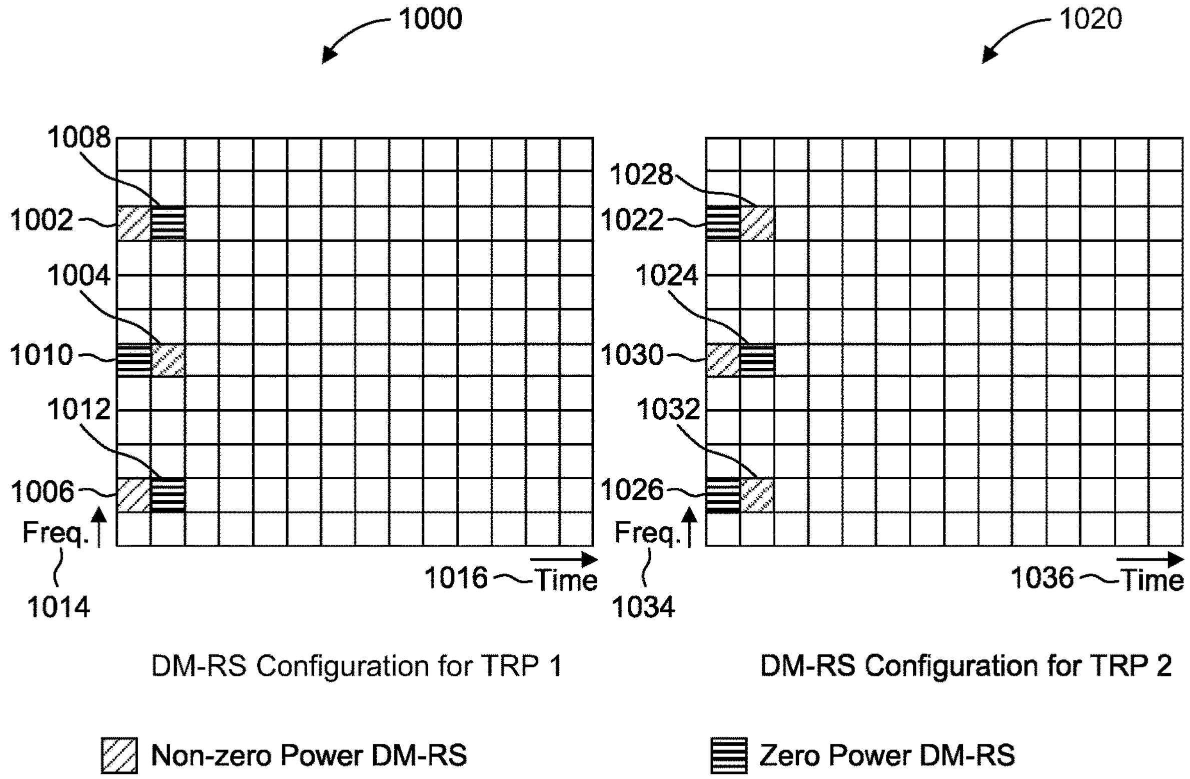
FIG. 10 is an illustration of second zero-power and non-zero power DM-RS configurations for a PDCCH transmission with a 2 OFDM symbol duration.

FIG. 10 shows second zero-power and non-zero power DM-RS configurations 1000, 1020 for a PDCCH transmission with a 2 OFDM symbol duration. In an example configuration 1000 for a first TRP, non-zero power DM-RS symbols 1002-1006 may alternate with zero power DM-RS symbols 1008-1012 in the time domain 1016 and occupy the same frequency resources in the frequency domain 1014.

In an example configuration 1020 for a second TRP, zero power DM-RS symbols 1022-1026 may alternate with non-zero power DM-RS symbols 1028-1032 in the time domain 1036 but may occupy the same resources in the frequency domain 1034.

FIG. 11 shows first zero-power and non-zero power DM-RS configurations 1110, 1130 for a PDCCH transmission with a 3 OFDM symbol duration. In an example 1110 for a first TRP, non-zero power DM-RS 1102-1112 are placed before and after zero power DM-RS symbols 1114-1118 in time 1122. Non-zero power DM-RS may or may not be placed in same frequency domain 1120 locations as zero power DM-RS.

A configuration 1130 for a second TRP may employ a zero power DM-RS 1132-1142 with non-zero power DM-RS symbols 1146-1148 located in between the zero power DM-RS symbols 1132-1142 in time 1152. non-zero power DM-RS symbols 1146-1148 may or may not be placed in same frequency domain 1150 locations as zero power DM-RS 1132-1142.

Figure 12:
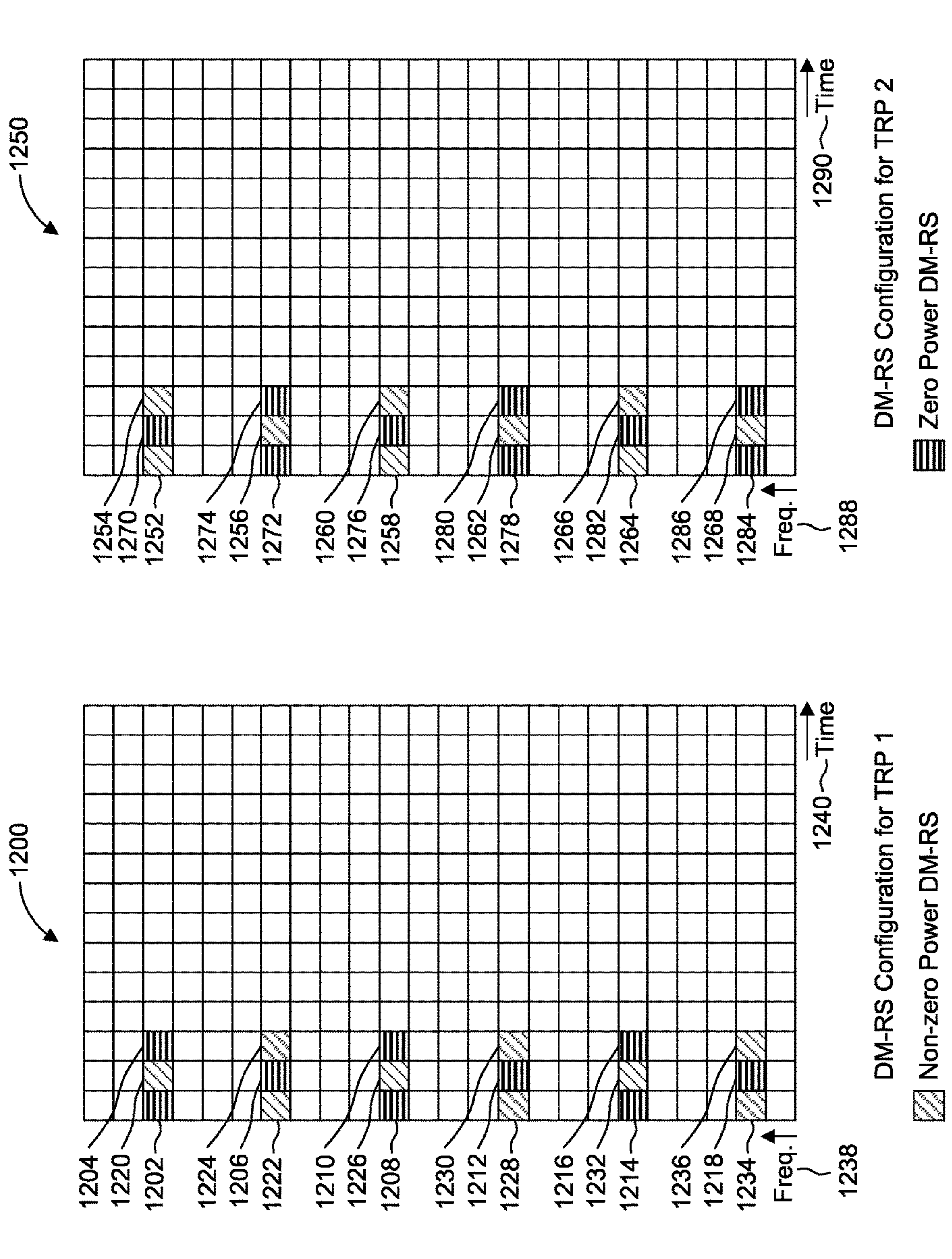
FIG. 12 is an illustration of second zero-power and non-zero power DM-RS configurations for a PDCCH transmission with a 3 OFDM symbol duration-configuration.

FIG. 12 is an illustration of second zero-power and non-zero power DM-RS configurations 1200, 1250 for a PDCCH transmission with a 3 OFDM symbol duration-configuration. In the example configuration 1200, zero power DM-RS symbols 1202-1218 and non-zero power DM-RS 1220-1236 may alternate in the time domain 1240 and in the frequency domain 1238. In the example configuration 1250, non-zero power DM-RS 1250-1268 and zero power DM-RS symbols 1270-1286 and may alternate in the time domain 1290 and in the frequency domain 1288.

Figure 13:
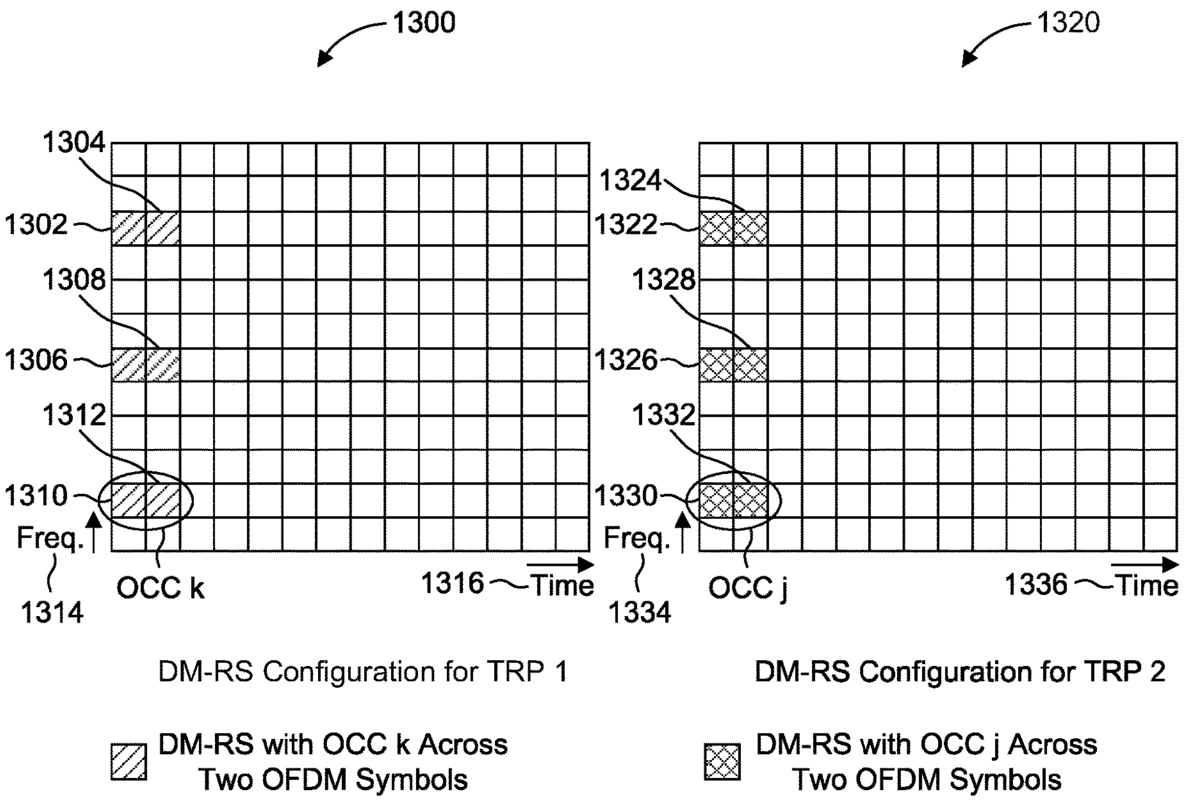
FIG. 13 is an illustration of orthogonal cover code (OCC) based DM-RS configurations for a PDCCH transmission with a 2 OFDM symbol duration.

FIG. 13 is an illustration of orthogonal cover code (0CC) based DM-RS configurations 1300, 1320 for a PDCCH transmission with a 2 OFDM symbol duration. In configuration 1300, a DM-RS 1302-1312 with OCC k is shown spanning across two OFDM symbols in the time domain 1316. DM-RS may be located in same resources in the frequency domain 1314. In configuration 1320, a DM-RS 1322-1332 with OCC j is shown spanning across two OFDM symbols in the time domain 1336. DM-RS may be located in same resources in the frequency domain 1334.

Each of the configuration examples shown in FIGS. 8-13 are for example purposes and are not meant to be limiting examples.

Multiple TCI states may be activated for PDCCH reception. To receive a PDCCH transmission in an SFN implementation, two TCI states may be activated for a CORESET. To this end, TCI state indication may be extended to define two TCI states for the same codepoint, one TCI state per each TRP. The WTRU may determine a QCL relationship between RSs and PDCCH DM-RSs from each TRP based on the TCI states activated.

In the case TCI states have not been indicated to a WTRU, the WTRU may assume that the antenna ports associated with the PDCCH DM-RSs are quasi co-located with the corresponding SSBs received from respective TRPs.

Dynamic switching between HST-SFN transmission schemes may be enabled. Switching between HST-SFN transmission schemes may be initiated by a WTRU or the network. When a WTRU wishes to switch the transmission scheme, it may indicate the switching request by transmitting a specific SRS from an SRS resource set pre-configured by the network. When the network switches the transmission scheme, the WTRU may determine the transmission scheme based on one or more of the following approaches. In some approaches, the WTRU may determine the transmission scheme based on the reception of two DM-RSs (HST-SFN downlink transmission scheme 2) or only one DM-RS (HST-SFN downlink transmission scheme 1). The WTRU may attempt to estimate both DM-RSs always and determine the existence of two or one DM-RS.

In some approaches, the WTRU may determine the HST-SFN downlink transmission scheme based on the CDM group DM-RSs are configured. For example, when DM-RSs are configured from two CDM groups, the WTRU may determine that HST-SFN downlink transmission scheme 2 is enabled. When DM-RSs from two TRPs are configured from the same CDM group, the WTRU may determine that HST-SFN transmission scheme 1 is enabled.

In some approaches, the WTRU may determine the HST-SFN transmission scheme based on the TCI/QCL relationship between PDSCH DM-RSs and TRSs. For example, when each TRS is used as a source RS in TCI states, and PDSCH DM-RSs are Type-A and Type-D QCL-ed with TRSs, the WTRU may determine that HST-SFN downlink transmission scheme 2 is enabled.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed by a wireless transmit/receive unit (WTRU), the method comprising:

receiving zone configuration information pertaining to one or more zones, each zone of the one or more zones having one or more zone identifiers (zone-ids), wherein the configuration information indicates, for each respective zone-id of the one or more zone-ids, at least:

(i) a beam reference signal (BRS) identified by a reference-signal index with quasi-co-location (QCL) type-D;

(ii) uplink resources associated with each respective zone-id; and (iii) a set of transmission configuration indicator (TCI) states, a search space, or a control resource set (CORESET) configuration; and transmitting, to a base station, an indication of a determined zone-id via uplink resources associated with the determined zone-id, the determined zone-id being determined from the one or more zone-ids based on a measurement of one or more BRSs indicated by the configuration information, wherein the indication of the determined zone-id is transmitted via one or more of:

(i) a scheduling request on a physical uplink control channel (PUCCH) scheduling-request resource associated with the determined zone-id;

(ii) a transmission, on a configured-grant physical uplink shared channel (PUSCH) resource associated with the determined zone-id, of a medium access control (MAC) control element including a zone-id field; or (iii) a physical random access channel (PRACH) preamble selected from a set of PRACH preambles associated with the determined zone-id.

2. The method of claim 1, wherein zone configurations of the zone configuration information are defined by geographical coordinates.

3. The method of claim 1, wherein the determining of the zone-id from among the one or more zone-ids is further based on geographical coordinates of the WTRU.

4. The method of claim 1, wherein each zone-id is associated with the BRS identified by the reference-signal index with QCL type-D, and the BRS is used to perform the measurement to determine the zone-id.

5. The method of claim 1, wherein each zone-id is associated with a set of transmission configuration indicator (TCI) states as indicated by the configuration information for receiving a physical downlink shared channel (PDSCH).

6. The method of claim 1, wherein each zone-id is associated with a search space as indicated by the configuration information.

7. The method of claim 1, wherein each zone-id is associated with a control resource set (CORESET) configuration as indicated by the configuration information.

8. The method of claim 1, wherein each zone-id is associated with uplink resources.

9. A method performed by a wireless transmit/receive unit (WTRU), the method comprising:

receiving zone configuration information pertaining to one or more zones, each zone of the one or more zones having one or more zone identifiers (zone-ids), wherein the configuration information indicates, for each respective zone-id of the one or more zone-ids, at least:

(i) a beam reference signal (BRS) identified by a reference-signal index with quasi-co-location (QCL) type-D;

(ii) uplink resources associated with each respective zone-id; and (iii) a set of transmission configuration indicator (TCI) states, a search space, or a control resource set (CORESET) configuration;

determining a zone-id of the one or more zone-ids, based on a measurement of one or more BRSs indicated by the configuration information;

monitoring, in a search space associated with the determined zone-id according to a search-space configuration indicated for the determined zone-id, for a physical downlink control channel (PDCCH) transmission;

receiving downlink control information (DCI) of the PDCCH transmission, the DCI indicating a TCI state, from the set associated with the determined zone-id, for receiving a physical downlink shared channel (PDSCH) transmission;

determining, based on the determined zone-id, a reference signal (RS) associated with the TCI state indicated by the DCI;

receiving the PDSCH using an associated PDSCH demodulation reference signal (DMRS) that is quasi co-located with the determined RS; and transmitting, to a base station, an indication of the determined zone-id, via uplink resources associated with the determined zone-id, wherein the indication is transmitted via one or more of:

(i) a scheduling request on a physical uplink control channel (PUCCH) scheduling-request resource associated with the determined zone-id;

(ii) a transmission, on a configured-grant physical uplink shared channel (PUSCH) resource associated with the determined zone-id, of a medium access control (MAC) control element including a zone-id field; or (iii) a physical random access channel (PRACH) preamble selected from a set of PRACH preambles associated with the determined zone-id.

10. The method of claim 9, wherein zone configurations of the zone configuration information are defined by geographical coordinates.

11. The method of claim 9, wherein the determining of the zone-id from among the one or more zone-ids is further based on geographical coordinates of the WTRU.

12. The method of claim 9, wherein each zone-id is associated with the BRS identified by the reference-signal index with QCL type-D, and the BRS is used to perform the measurement to determine the zone-id.

13. The method of claim 9, wherein each zone-id is associated with a set of transmission configuration indicator (TCI) states as indicated by the configuration information for receiving a physical downlink shared channel (PDSCH).

14. The method of claim 9, wherein each zone-id is associated with a search space as indicated by the configuration information.

15. The method of claim 9, wherein each zone-id is associated with a control resource set (CORESET) configuration as indicated by the configuration information.

16. The method of claim 9, wherein each zone-id is associated with uplink resources.

17. A wireless transmit/receive unit (WTRU) comprising:

a receiver configured to receive zone configuration information pertaining to one or more zones having one or more zone identifiers (zone-ids), wherein the configuration information indicates, for each respective zone-id of the one or more zone-ids, at least:

(i) a beam reference signal (BRS) identified by a reference-signal index with quasi-co-location (QCL) type-D;

(ii) uplink resources associated with each respective zone-id; and (iii) a set of transmission configuration indicator (TCI) states, a search space, or a control resource set (CORESET) configuration; and circuitry configured to indicate, to a base station, a determined zone-id via uplink resources associated with the determined zone-id, the determined zone-id being determined from the one or more zone-ids based on a measurement of one or more BRSs indicated by the configuration information, wherein the indication of the determined zone-id is transmitted via one or more of:

(i) a scheduling request on a physical uplink control channel (PUCCH) scheduling-request resource associated with the determined zone-id;

(ii) a transmission, on a configured-grant physical uplink shared channel (PUSCH) resource associated with the determined zone-id, of a medium access control (MAC) control element including a zone-id field; or (iii) a physical random access channel (PRACH) preamble selected from a set of PRACH preambles associated with the determined zone-id.

18. The WTRU of claim 17, further comprising:

circuitry configured to monitor a search space in a CORESET, associated with the determined zone-id as indicated by the configuration information, for a physical downlink control channel (PDCCH) transmission.

19. The WTRU of claim 18, further comprising:

the receiver configured to receive downlink control information (DCI) of the PDCCH transmission, wherein the DCI indicates a TCI state for receiving a PDSCH transmission.

20. The WTRU of claim 19, further comprising:

circuitry configured to determine, based on the determined zone-id, a reference signal (RS) associated with the TCI state indicated by the DCI; and the receiver further configured to receive the PDSCH using an associated PDSCH demodulation reference signal (DMRS) that is quasi co-located with the determined RS.

* * * * *